US012131836B2

(12) United States Patent
Nonaka et al.

(10) Patent No.: US 12,131,836 B2
(45) Date of Patent: Oct. 29, 2024

(54) POLYURETHANE, POLYURETHANE PRODUCTION METHOD, CONDUCTIVE PASTE COMPOSITION, CONDUCTIVE WIRE, AND METHOD FOR PRODUCING CONDUCTIVE WIRE

(71) Applicant: SHIN-ETSU CHEMICAL CO., LTD., Tokyo (JP)

(72) Inventors: Shiori Nonaka, Joetsu (JP); Koji Hasegawa, Joetsu (JP); Osamu Watanabe, Joetsu (JP); Jun Hatakeyama, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 289 days.

(21) Appl. No.: 17/518,453

(22) Filed: Nov. 3, 2021

(65) Prior Publication Data
US 2022/0157484 A1 May 19, 2022

(30) Foreign Application Priority Data

Nov. 13, 2020 (JP) .................. 2020-189815

(51) Int. Cl.
*H01B 1/12* (2006.01)
*C08L 75/04* (2006.01)
*H01B 1/02* (2006.01)

(52) U.S. Cl.
CPC .............. *H01B 1/12* (2013.01); *C08L 75/04* (2013.01); *H01B 1/02* (2013.01)

(58) Field of Classification Search
CPC ..................................................... C08L 75/04
See application file for complete search history.

(56) References Cited

U.S. PATENT DOCUMENTS

| 7,501,472 | B2 | 3/2009 | Steidl et al. |
| 2004/0186194 | A1 | 9/2004 | Joern et al. |
| 2004/0192835 | A1 | 9/2004 | Steidl et al. |
| 2020/0082957 | A1 | 3/2020 | Matsuhisa et al. |
| 2020/0377749 | A1 | 12/2020 | Otani et al. |

FOREIGN PATENT DOCUMENTS

| CN | 1547599 | A | | 11/2004 | |
| CN | 102346374 | A | | 2/2012 | |
| CN | 104995224 | A | | 10/2015 | |
| EP | 1 791 882 | B1 | | 7/2010 | |
| JP | H 03157413 | A | * | 7/1991 | ............. C08G 18/32 |
| JP | 2006-225432 | A | | 8/2006 | |
| JP | 3923861 | B2 | | 6/2007 | |
| JP | 2009-19081 | A | | 1/2009 | |
| JP | 2009-79179 | A | | 4/2009 | |
| JP | 2010-195919 | A | | 9/2010 | |
| JP | 2010-195920 | A | | 9/2010 | |
| JP | 2010-222548 | A | | 10/2010 | |
| JP | 2011-143689 | A | | 7/2011 | |
| JP | 6202177 | B1 | | 9/2017 | |
| JP | 2017-183207 | A | | 10/2017 | |
| JP | 2018-060987 | A | | 4/2018 | |
| JP | 2019-076214 | A | | 5/2019 | |
| JP | 2019-110093 | A | | 7/2019 | |
| JP | 6657525 | B2 | | 3/2020 | |
| WO | 2006/032511 | A1 | | 3/2006 | |
| WO | 2017/217509 | A1 | | 12/2017 | |
| WO | 2018/110632 | A1 | | 6/2018 | |
| WO | 2018/159374 | A1 | | 9/2018 | |
| WO | 2018/235734 | A1 | | 12/2018 | |

OTHER PUBLICATIONS

Mar. 23, 2022 Extended Search Report issued in European Patent Application No. 21207223.5.
Aug. 8, 2023 Office Action issued in Japanese Patent Application No. 2020-189815.
Aug. 14, 2023 Office Action issued in Chinese Patent Application No. 202111334279.3.
Feb. 28, 2024 Office Action issued in Chinese Patent Application No. 202111334279.3.
Apr. 23, 2024 Office Action issued in Korean Patent Application No. 10-2021-0153419.

* cited by examiner

*Primary Examiner* — Khanh T Nguyen
(74) *Attorney, Agent, or Firm* — Oliff PLC

(57) ABSTRACT

A polyurethane contains a weakly acidic functional group having a pKa of 5 to 11. Thus, the present invention provides: a conductive paste composition for forming a stretchable conductive wire which varies slightly in electric conductivity at the time of elongation and shrinkage; and a polyurethane for providing the composition.

17 Claims, No Drawings

POLYURETHANE, POLYURETHANE PRODUCTION METHOD, CONDUCTIVE PASTE COMPOSITION, CONDUCTIVE WIRE, AND METHOD FOR PRODUCING CONDUCTIVE WIRE

TECHNICAL FIELD

The present invention relates to a conductive paste composition for forming a stretchable conductive wire, and a polyurethane for providing the composition.

BACKGROUND ART

Recently, development of wearable devices that can be attached to human body has been progressing with the spread of IoT (Internet of Things). Particularly, in the fields of medicine, health care, long-term care, and sports, wearable devices are expected to be utilized and examined for early discovery of diseases and health management, for example, by monitoring biological information and exercise information or sensing body movements in real time.

The forms of wearable devices that enable continuous measurement of biological information include: accessory, such as watches, eye-glasses, and ear phones; cloth; patch for direct attachment to body; etc. For stable measurement of biological information, a wearable device needs to fit to the body surface in use. Particularly, cloth-type and patch-type devices are required to have high flexibility and stretchability to follow body movements, as well as durability against repetitive stretching. Thus, it is important to develop techniques and materials for imparting stretchability to wires and sensors.

For example, Patent Document 1 discloses a wearable device which uses a bellows-shaped stretchable silver wire covered with a stretchable urethane film. Even if the metal wire itself does not have stretchability, pseudo-stretchability is achieved by wiring design and the electric conductivity is ensured.

Moreover, there have been reported: a method in which a woven fabric is formed by weaving a conductive thread to have stretchability (Patent Document 2); and a method in which a stretchable conductive composite thread is formed by winding a conductive fiber around a stretchable elastic fiber for use (Patent Document 3).

However, the method of weaving a conductive thread has such problems that the pattern shape to be formed is limited, and that the throughput is low in comparison with pattern formation by printing. Further, in the method of Patent Document 1 also, the pattern shape is limited, and compact wiring design is difficult. Hence, developments of stretchable, electro-conductive paste and ink have been enthusiastically carried out to succeed the formation by printing of a wire enabling electric conduction in the event of wire elongation (stretching), too.

There are many proposals or applications such as, for example, stretchable wires using Galinstan including gallium-indium-tin or a liquid metal including gallium-indium; a stretchable wire in which silver nanowires are mixed as a metal additive (Patent Document 4); a stretchable wire which contains a combination of a fluorine rubber, a surfactant, and silver filler and generates silver nanoparticles during annealing (Patent Document 5); a stretchable wire using silver flakes having suitable tap density and average particle diameter (Patent Document 6); a stretchable wire using a silver powder having suitable particle diameter, particle size distribution, and porosity (Patent Document 7); etc.

CITATION LIST

Patent Literature

Patent Document 1: JP 3923861 B2
Patent Document 2: JP 6657525 B2
Patent Document 3: JP 2019-76214 A
Patent Document 4: WO 2017/217509 A1
Patent Document 5: WO 2018/110632 A1
Patent Document 6: JP 2019-110093 A
Patent Document 7: WO 2018/235734 A1

SUMMARY OF INVENTION

Technical Problem

The present invention has been made to solve the above-mentioned problems. An object of the present invention is to provide: a conductive paste composition for forming a stretchable conductive wire which varies slightly in electric conductivity at the time of elongation and shrinkage; and a polyurethane for providing the composition.

Solution to Problem

To achieve the object, the present invention provides a polyurethane comprising a weakly acidic functional group having a pKa of 5 to 11.

Such a polyurethane provides a conductive paste composition for forming a stretchable conductive wire which varies slightly in electrical conductivity at the time of elongation and shrinkage.

In the present invention, the weakly acidic functional group preferably comprises a fluorine atom.

When used to prepare a conductive paste composition for forming a stretchable conductive wire, such a polyurethane can further reduce the variation of the electric conductivity at elongation and shrinkage.

More preferably, in the present invention, the weakly acidic functional group comprises a structure shown by any of the following general formulae (1a) to (1c),

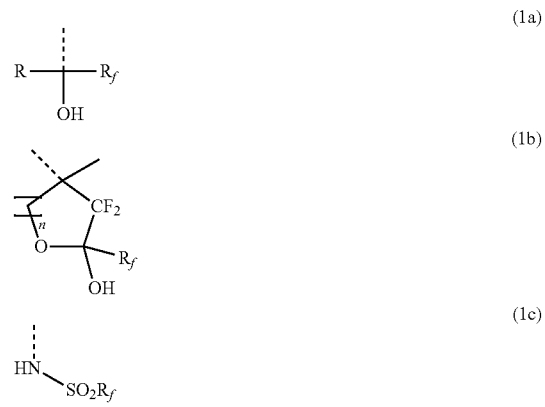

wherein R represents a hydrogen atom, a fluorine atom, or a linear, branched, or cyclic hydrocarbon group having 1 to 10 carbon atoms and optionally fluorinated; $R_f$ represents a fluorine atom, or a linear, branched, or cyclic fluorinated hydrocarbon group having 1 to 10 carbon atoms; "n" represents an integer of 1 or 2; and a broken line represents a bonding arm.

When used to prepare a conductive paste composition for forming a stretchable conductive wire, such a polyurethane can furthermore reduce the variation of the conductivity at elongation and shrinkage.

The polyurethane of the present invention preferably comprises a structure shown by any of the following general formulae (2a) to (2c),

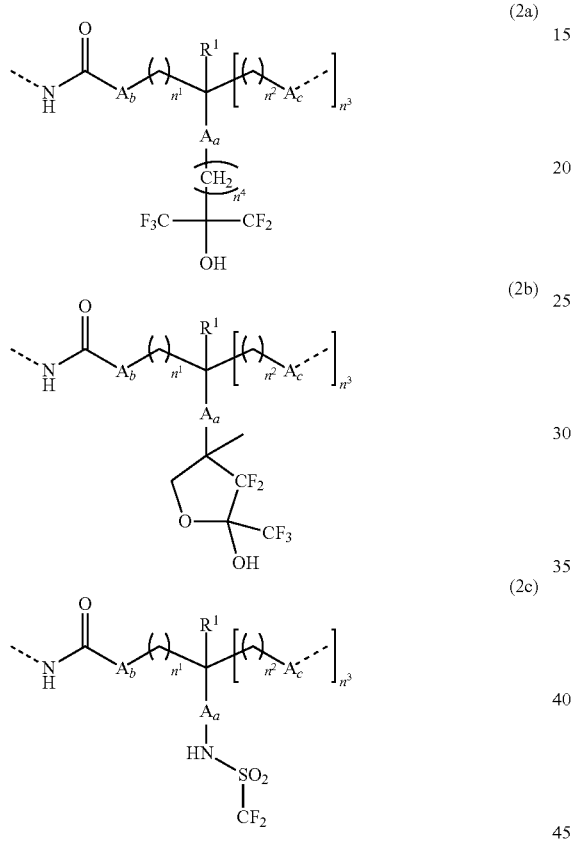

wherein $R^1$ represents a hydrogen atom or a monovalent hydrocarbon group having 1 to 3 carbon atoms; $A_a$ represents a single bond, or a linear, branched, or cyclic divalent hydrocarbon group having 1 to 20 carbon atoms, and —$CH_2$— constituting $A_a$ is optionally substituted with —O—, —C(=O)—, —C(=O)O—, —$C_6H_4$—, or —$NR^5$—C(=O)—; $R^5$ represents a hydrogen atom, or a linear or branched alkyl group having 1 to 4 carbon atoms; $A_b$ and $A_c$ each represent —O—, —O—C(=O)—$NR^5$—, —$NR^5$—, or —C(=O)O—; $n^1$, $n^2$, and $n^4$ each represent an integer of 0 to 10; $n^3$ represents an integer of 0 or 1; and a broken line represents a bonding arm.

Such a polyurethane incorporated in a conductive paste composition for forming a stretchable conductive wire enables even more reduction of the variation of the conductivity at elongation and shrinkage.

Moreover, the present invention provides a method for producing the above-described polyurethane, the method comprising introducing the weakly acidic functional group to a polyurethane by using a chain extender which is an alcohol shown by the following general formula (3a) or (3b),

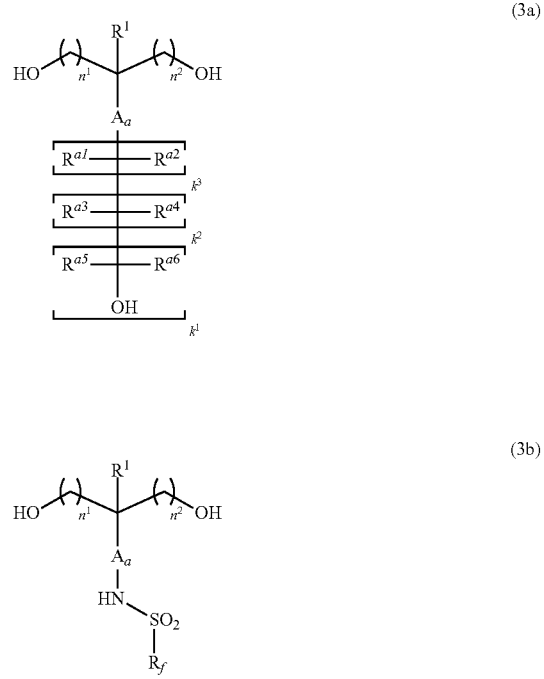

wherein $R^{a1}$, $R^{a2}$, $R^{a3}$, $R^{a4}$, $R^{a5}$, and $R^{a6}$ each independently represent a hydrogen atom, a fluorine atom, an oxygen atom, a linear, branched, or cyclic hydrocarbon group, a perfluoroalkyl group, a perfluoroalkylene group, or a perfluoroalkoxy group, which groups have 1 to 6 carbon atoms, provided that at least one of $R^{a1}$, $R^{a2}$, $R^{a3}$, $R^{a4}$, $R^{a5}$, and $R^{a6}$ is a fluorine atom, a perfluoroalkyl group, a perfluoroalkylene group, or a perfluoroalkoxy group; $R^{a1}$ and $R^{a2}$, $R^{a3}$ and $R^{a4}$, $R^{a5}$ and $R^{a6}$, $R^{a1}$ and $R^{a3}$, $R^{a1}$ and $R^{a5}$, or $R^{a3}$ and $R^{a5}$, are optionally bonded to each other together with a carbon atom bonded therewith to form a non-aromatic ring having 3 to 8 carbon atoms; some —$CH_2$-constituting $R^{a1}$, $R^{a2}$, $R^{a3}$, $R^{a4}$, $R^{a5}$, or $R^{a6}$ is optionally substituted with an oxygen atom to form a hetero ring; $k^1$ represents an integer of 1 or 2; $k^2$ and $k^3$ each represent an integer of 0 to 10; $R_f$ represents a fluorine atom, or a linear, branched, or cyclic fluorinated hydrocarbon group having 1 to 10 carbon atoms; and $R^1$, $A_a$, $n^1$, and $n^2$ are as defined above.

Such a polyurethane production method makes it possible to easily synthesize the polyurethane.

In this case, the weakly acidic functional group is preferably introduced to a polyurethane by using a chain extender which is an alcohol shown by any of the following general formulae (4a) to (4c),

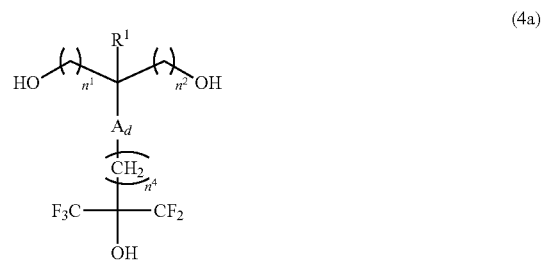

-continued

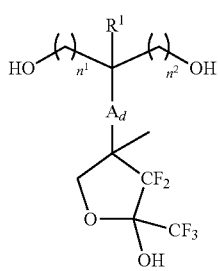

(4b)

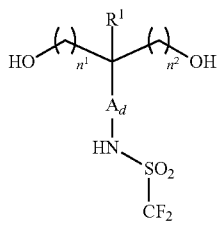

(4c)

wherein $A_d$ represents a single bond, or a linear, branched, or cyclic divalent hydrocarbon group having 1 to 20 carbon atoms, and —$CH_2$— constituting $A_d$ is optionally substituted with —O—, —C(=O)—, —C(=O)O—, —$C_6H_4$—, or —$NR^5$—C(=O)—; and $R^1$, $n^1$, $n^2$, and $n^4$ are as defined above.

Such a polyurethane production method can further facilitate the synthesis of the polyurethane.

Further preferably, the weakly acidic functional group is introduced to a polyurethane by using a chain extender which is an alcohol shown by the following general formula (5),

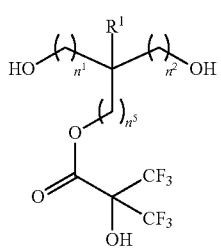

(5)

wherein $n^5$ represents an integer of 0 to 10; and $R^1$, $n^1$, and $n^2$ are as defined above.

Such a polyurethane production method can furthermore facilitate the polyurethane synthesis.

Further, the present invention provides a conductive paste composition comprising:
(A) a conductive filler;
(B) the above-described polyurethane comprising a weakly acidic functional group having a pKa of 5 to 11; and
(C) a solvent.

Such a conductive paste composition enables formation of a stretchable conductive wire which varies slightly in electric conductivity at the time of expansion and shrinkage.

In this case, the conductive filler of the component (A) is preferably contained in a proportion exceeding 70 parts by mass relative to 100 parts by mass of a total of the components (A) and (B).

Such a conductive paste composition can form a stretchable conductive wire whose electric conductivity varies more slightly at the time of elongation and shrinkage.

More preferably, in the present invention, the conductive filler is selected from the group consisting of gold, silver, silver chloride, platinum, copper, tin, iron, magnesium, titanium, nickel, palladium, aluminum, tungsten, molybdenum, ruthenium, chromium, indium, solder, carbon, and composites thereof.

Such a conductive paste composition enables formation of a stretchable conductive wire having higher electrical conductivity.

In this case, the conductive filler preferably has an average particle diameter of 5 nm to 10 μm.

Such a conductive filler is suitably blended in the conductive paste composition.

The conductive filler is particularly preferably a silver powder.

Such a conductive filler is suitable from the comprehensive viewpoints of conductivity and price.

Furthermore, the present invention provides a conductive wire comprising a baked product of the above-described conductive paste composition formed on a substrate.

The electric conductivity of such a conductive wire varies slightly at the time of elongation and shrinkage.

In this case, the substrate is preferably stretchable.

Such a substrate is suitable for the inventive conductive wire.

More preferably, in the present invention, the substrate is a thermoplastic polyurethane.

Such a substrate is more suitable for the inventive conductive wire.

Preferably, the inventive conductive wire elongated by 20% has an electric resistance which is 500% or less of an electric resistance before the elongation.

The electric conductivity of such a conductive wire varies slightly at the time of elongation and shrinkage, and the conductive wire is adaptable to an attachment location on skin.

More preferably, a maximum electric resistance of the inventive conductive wire which is elongated and shrunk repeatedly 1000 times with an elongation ratio of 20% is 5000% or less of an electric resistance before the elongations and the shrinkages.

Such a conductive wire has suitable conduction stability in repetitive elongations and shrinkages.

In addition, the present invention provides a method for producing a conductive wire by using the above-described conductive paste composition to form a conductive wire on a substrate, wherein the conductive wire is formed with a baking temperature of 60 to 160° C.

Such a method for producing a conductive wire makes it possible to reliably obtain a conductive wire which varies slightly in electric conductivity at the time of elongation and shrinkage.

Moreover, the present invention may comprise printing the conductive paste composition to form a conductive wire on a substrate.

In forming a wire pattern, printing successfully enhances the productivity.

Advantageous Effects of Invention

As described above, a conductive paste composition containing the inventive polyurethane makes it possible to form a conductive wire which varies slightly in conductivity at the time of elongation and shrinkage and is capable of efficiently conducting electric signals to a device (i.e., excellent in conductivity), and which is light-weight and manufacturable at low cost.

Moreover, because of the excellent conduction stability in repetitive elongations and shrinkages, the conductive wire thus formed is suitable for wearable devices in which strain is generated by human body movement.

DESCRIPTION OF EMBODIMENTS

In conventional techniques, a conductive wire using a conductive paste obtained by mixing a metal filler into a resin contains an insulating component, so that the electric resistance is higher than those of metal wires. In addition, increase in the resistance due to elongation and degradation due to repetitive elongations and shrinkages are inevitable, and the resulting wire may be broken in some cases. Moreover, there is concern that the variation in the electric conductivity due to elongation and shrinkage may affect the device operation. For these reasons, there have been demands for the development of an electro-conductive material composition having higher conductivity and less variation in the conductivity at the time of elongation and shrinkage.

The present inventors earnestly studied to solve the above problems and consequently found that when a conductive paste composition contains (A) a conductive filler, (B) a polyurethane containing a weakly acidic functional group having a pKa of 5 to 11, and (C) a solvent, the resulting conductive wire obtained by using this conductive paste composition has low resistance, less decrease in electric conductivity in stretching, and excellent conduction stability in repetitive elongations and shrinkages.

Particularly, the polyurethane containing a weakly acidic functional group having a pKa of 5 to 11 has not been known conventionally.

Specifically, the present invention is a polyurethane comprising a weakly acidic functional group having a pKa of 5 to 11.

Hereinafter, the present invention will be described in detail, but the present invention is not limited thereto.

A polyurethane according to the present invention contains a weakly acidic functional group with a pKa of 5 to 11, and is not particularly limited, as long the weakly acidic functional group is incorporated. Note that pKa in the present invention is a value calculated using pKa calculator in ChemSketch (Advanced Chemistry Development, Inc.).

The weakly acidic functional group is not particularly limited, as long as the group has a pKa of 5 or more and 11 or less. The weakly acidic functional group preferably contains a fluorine atom, and more preferably contains a structure shown by any of the following general formulae (1a) to (1c).

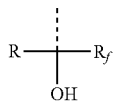
(1a)

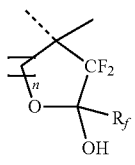
(1b)

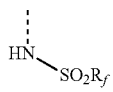
(1c)

In the formulae, R represents a hydrogen atom, a fluorine atom, or a linear, branched, or cyclic hydrocarbon group having 1 to 10 carbon atoms and optionally fluorinated. $R_f$ represents a fluorine atom, or a linear, branched, or cyclic fluorinated hydrocarbon group having 1 to 10 carbon atoms. "n" represents an integer of 1 or 2. A broken line represents a bonding arm.

Specific examples of R include a hydrogen atom, a fluorine atom, a methyl group, an ethyl group, a propyl group, an isopropyl group, an n-butyl group, a sec-butyl group, a tert-butyl group, a cyclopropyl group, a cyclobutyl group, a cyclopentyl group, a cyclohexyl group, a difluoromethyl group, a trifluoromethyl group, a 2,2,2-trifluoroethyl group, etc.

$R_f$ is preferably a fluorine atom, a difluoromethyl group, a trifluoromethyl group, a 2,2,2-trifluoroethyl group, etc.

The inventive polyurethane further preferably has a structure shown by any of the following general formulae (2a) to (2c).

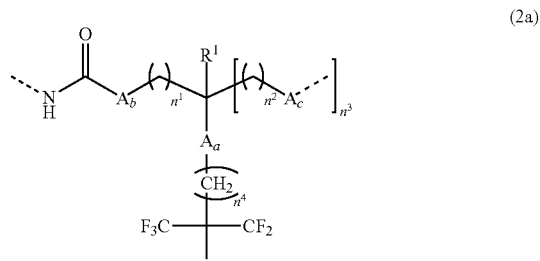
(2a)

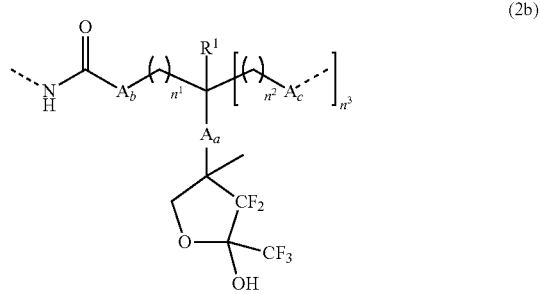
(2b)

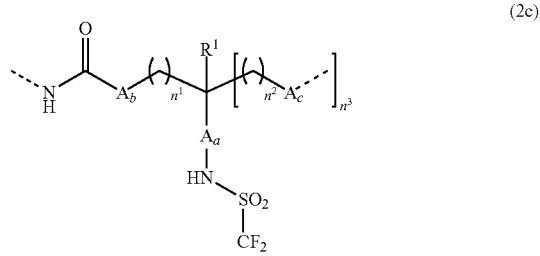
(2c)

In the formulae, $R^1$ represents a hydrogen atom or a monovalent hydrocarbon group having 1 to 3 carbon atoms. $A_a$ represents a single bond, or a linear, branched, or cyclic divalent hydrocarbon group having 1 to 20 carbon atoms, and —$CH_2$— constituting $A_a$ is optionally substituted with —O—, —C(=O)—, —C(=O)O—, —$C_6H_4$—, or —$NR^5$—C(=O)—. $R^5$ represents a hydrogen atom, or a linear or branched alkyl group having 1 to 4 carbon atoms. $A_b$ and $A_c$ each represent —O—, —O—C(=O)—$NR^5$—, —$NR^5$—, or —C(=O)O—. $n^1$, $n^2$, and $n^4$ each represent an integer of 0 to 10. $n^3$ represents an integer of 0 or 1. A broken line represents a bonding arm.

R[1] is preferably a hydrogen atom, a methyl group, or an ethyl group. R[5] is preferably a hydrogen atom, a methyl group, an ethyl group, a propyl group, or an isopropyl group.

Examples of the weakly acidic functional group having a pKa of 5 to 11 include groups containing fluoroalcohol, phenol, or sulfonamide as a partial structure. The inventive polyurethane can be efficiently obtained by reaction between a polyisocyanate and a polyol, polyamine, polycarboxylic acid, or the like having such a weakly acidic functional group.

Specific examples of the weakly acidic functional group with a pKa of 5 to 11 include fluoroalcohol-containing groups shown below.

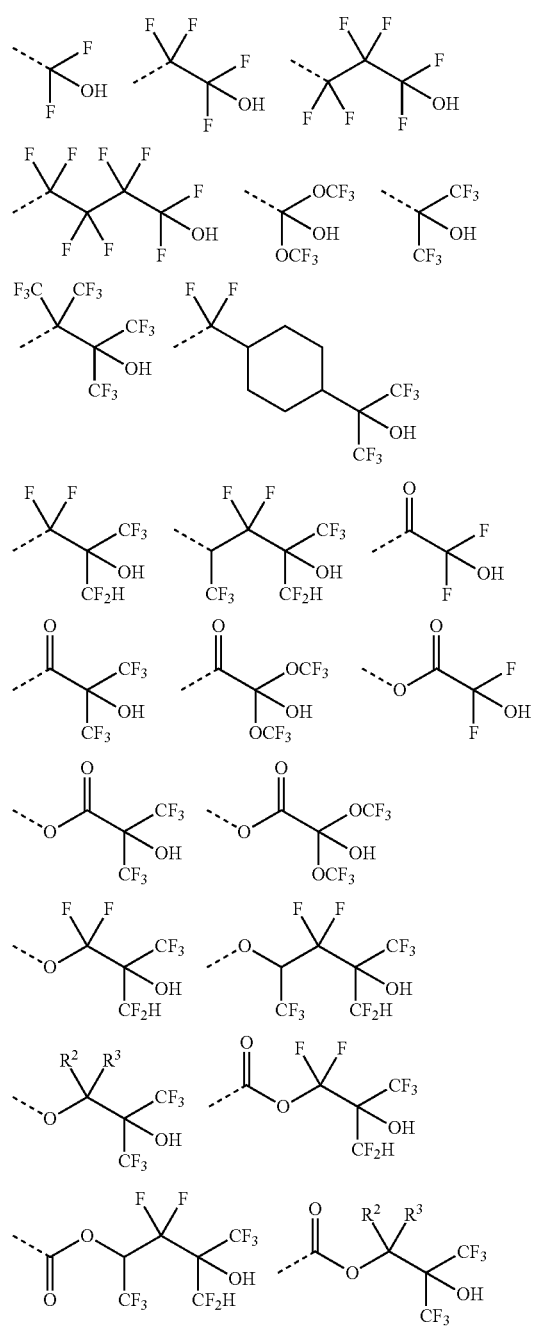

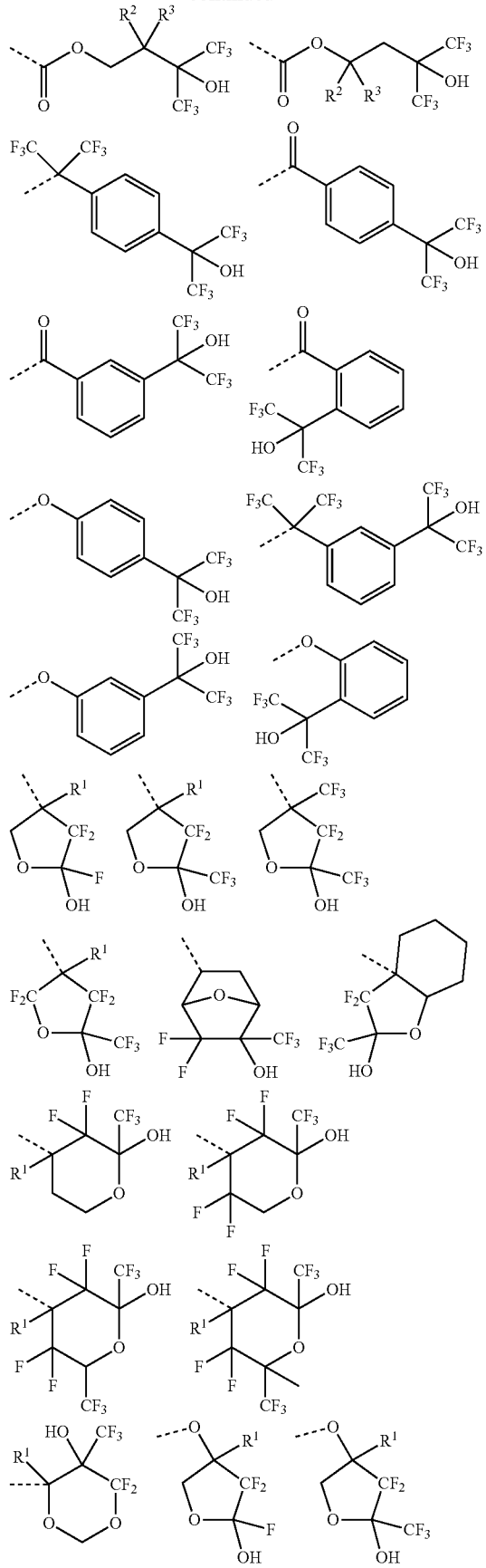

-continued

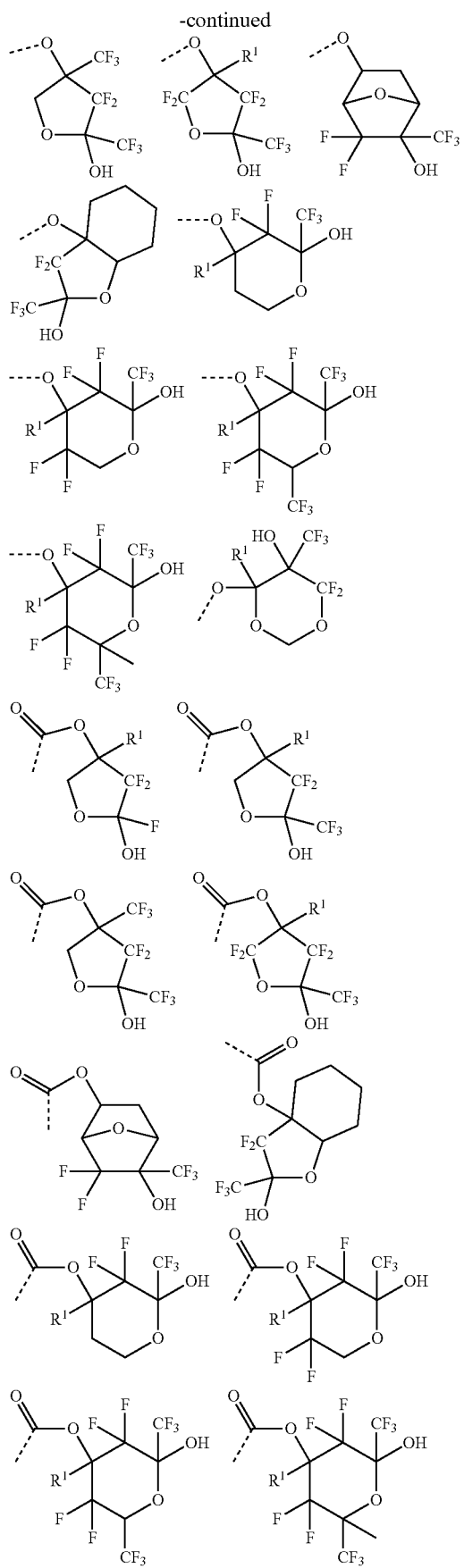

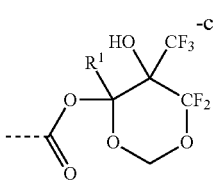

In the formulae, $R^1$ represents a hydrogen atom or a monovalent hydrocarbon group having 1 to 3 carbon atoms. $R^2$ and $R^3$ each independently represent a hydrogen atom or a linear, branched, or cyclic hydrocarbon group having 1 to 6 carbon atoms, and $R^2$ and $R^3$ are optionally bonded to each other to form a non-aromatic ring having 3 to 8 carbon atoms together with a carbon atom bonded to $R^2$ and $R^3$. Each broken line represents a bonding arm.

Specific examples of the weakly acidic functional group with a pKa of 5 to 11 include phenol-containing groups shown below.

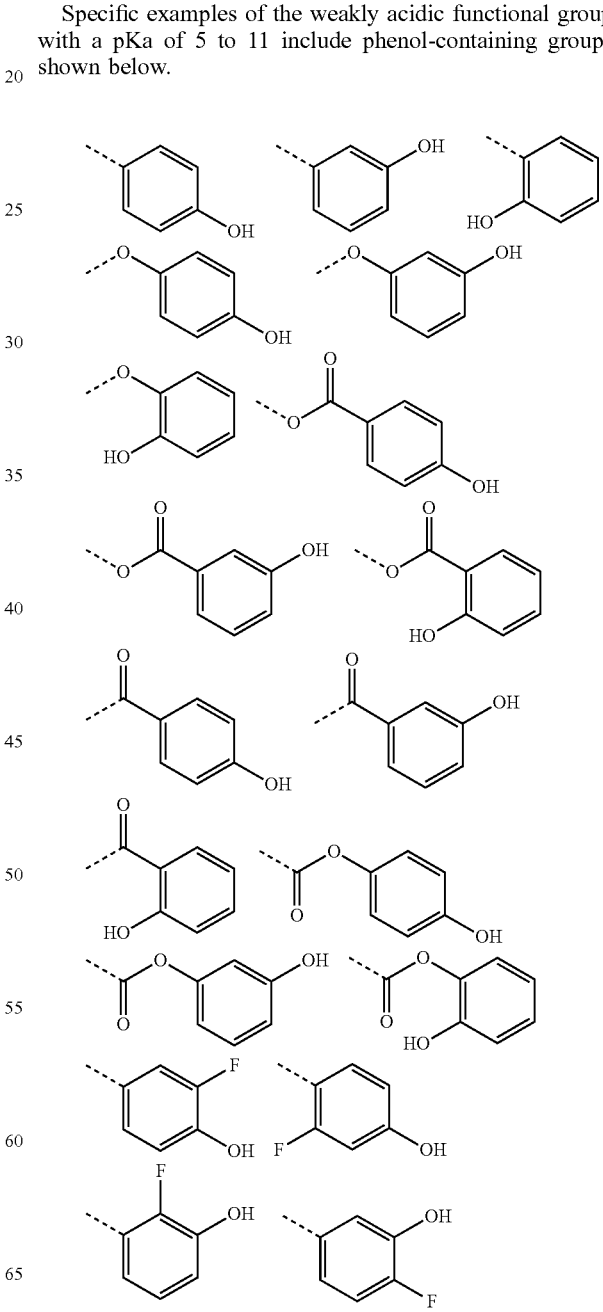

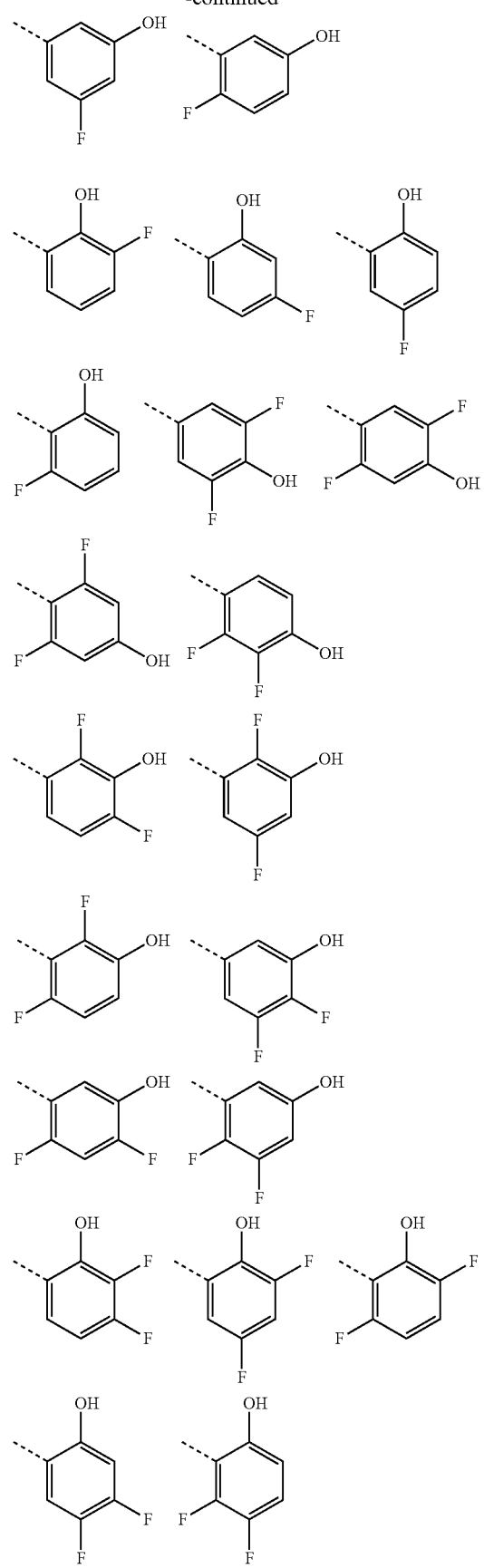
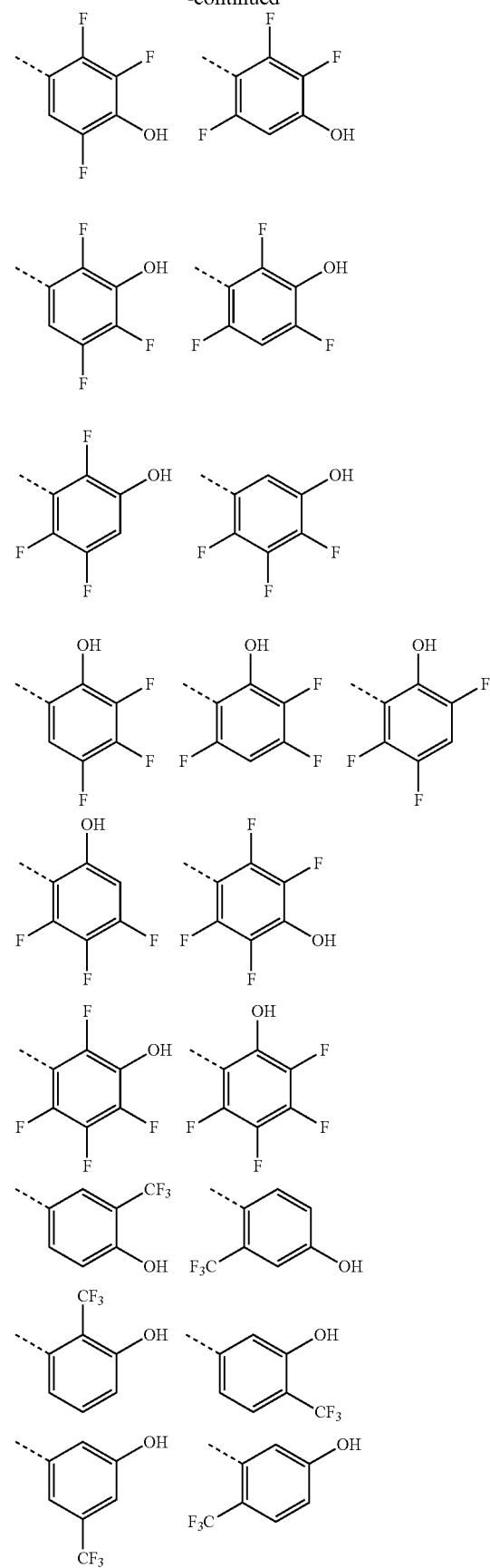

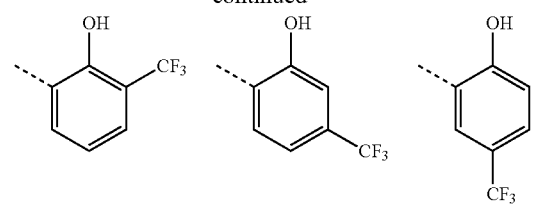
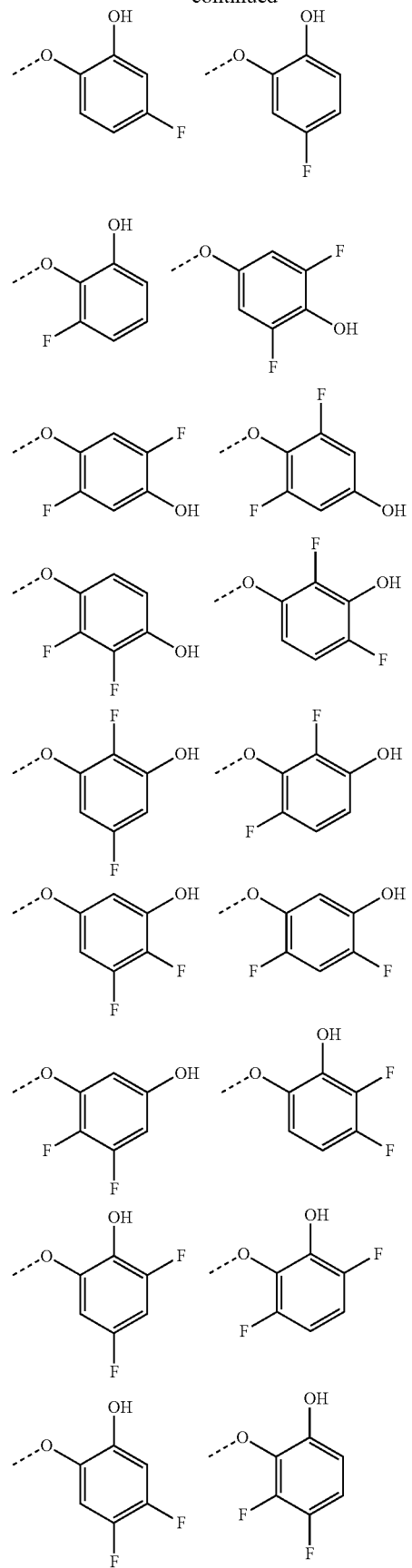

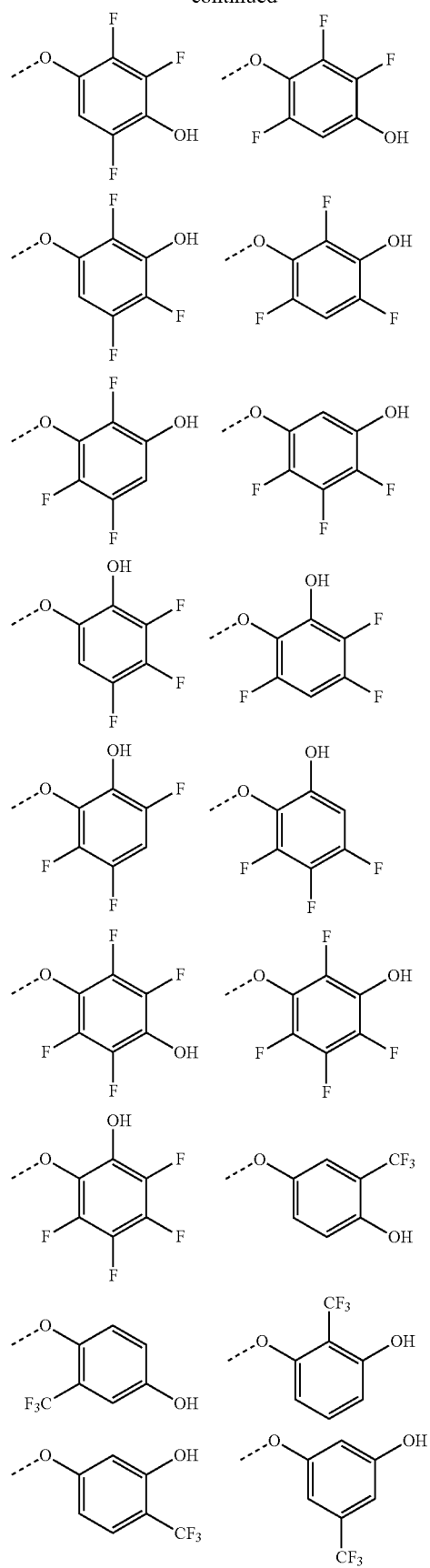
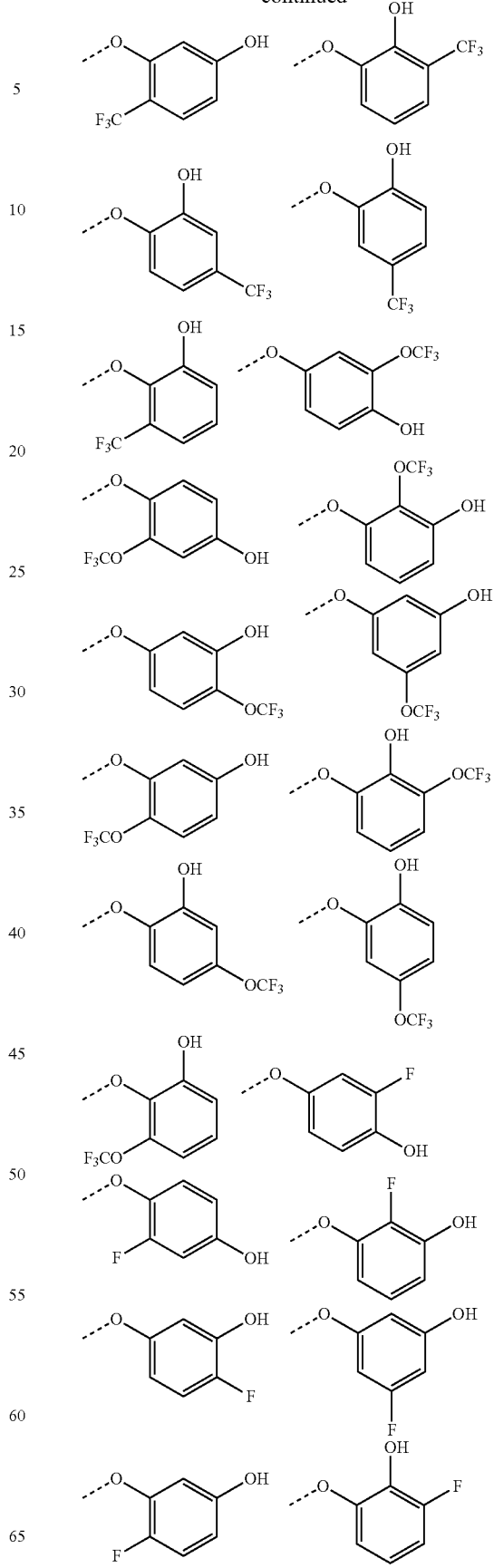

-continued
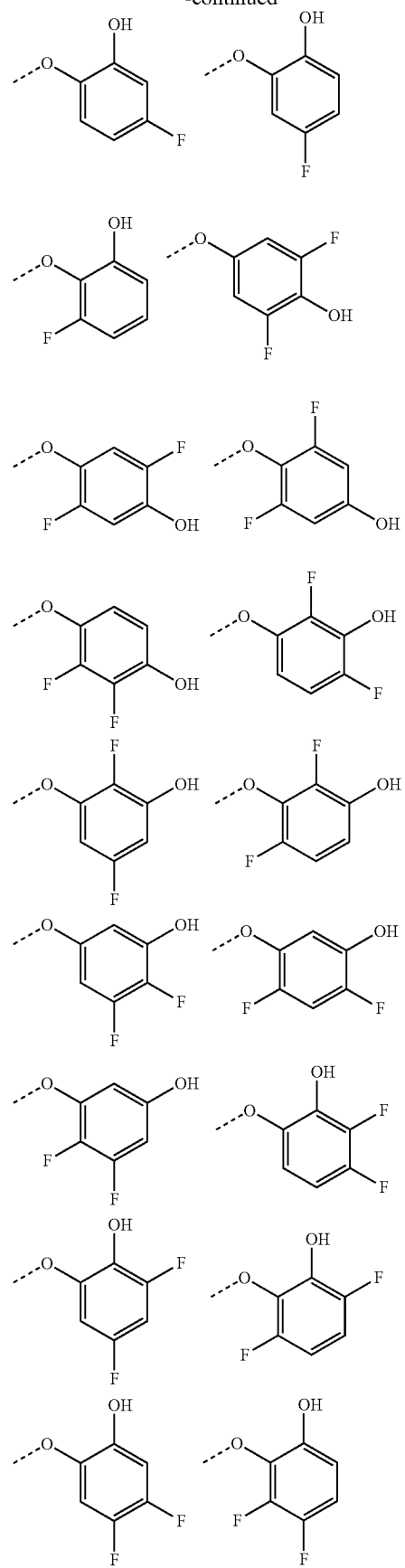
-continued
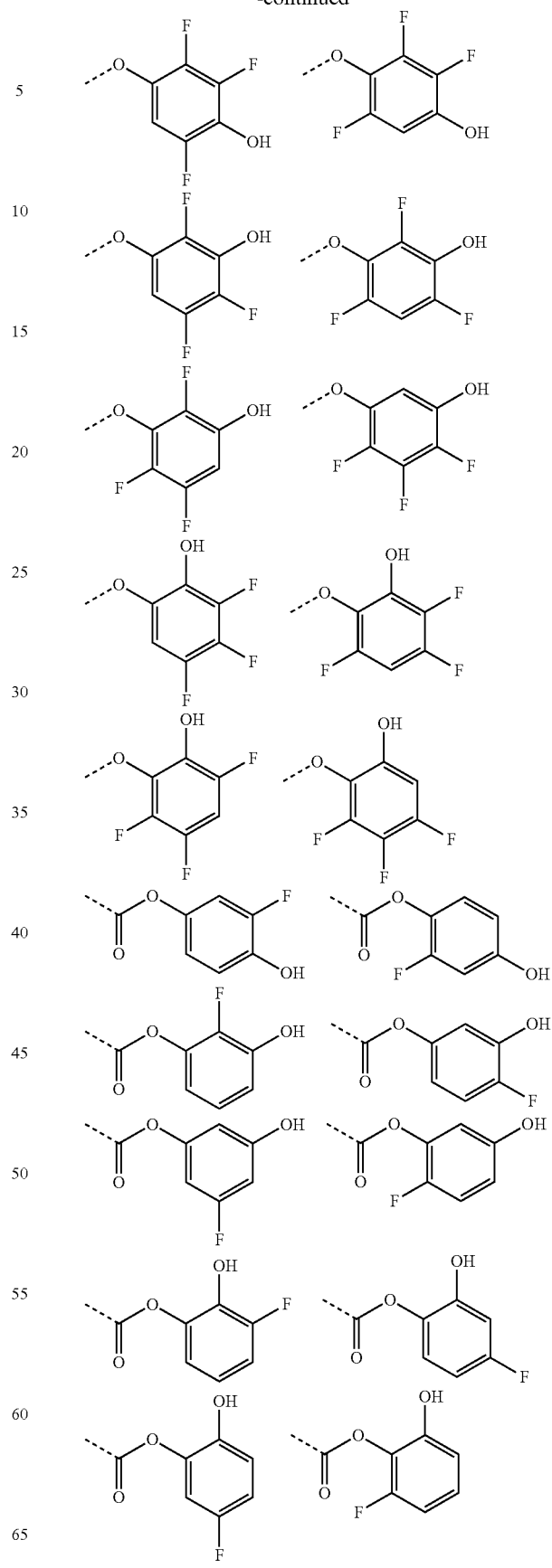

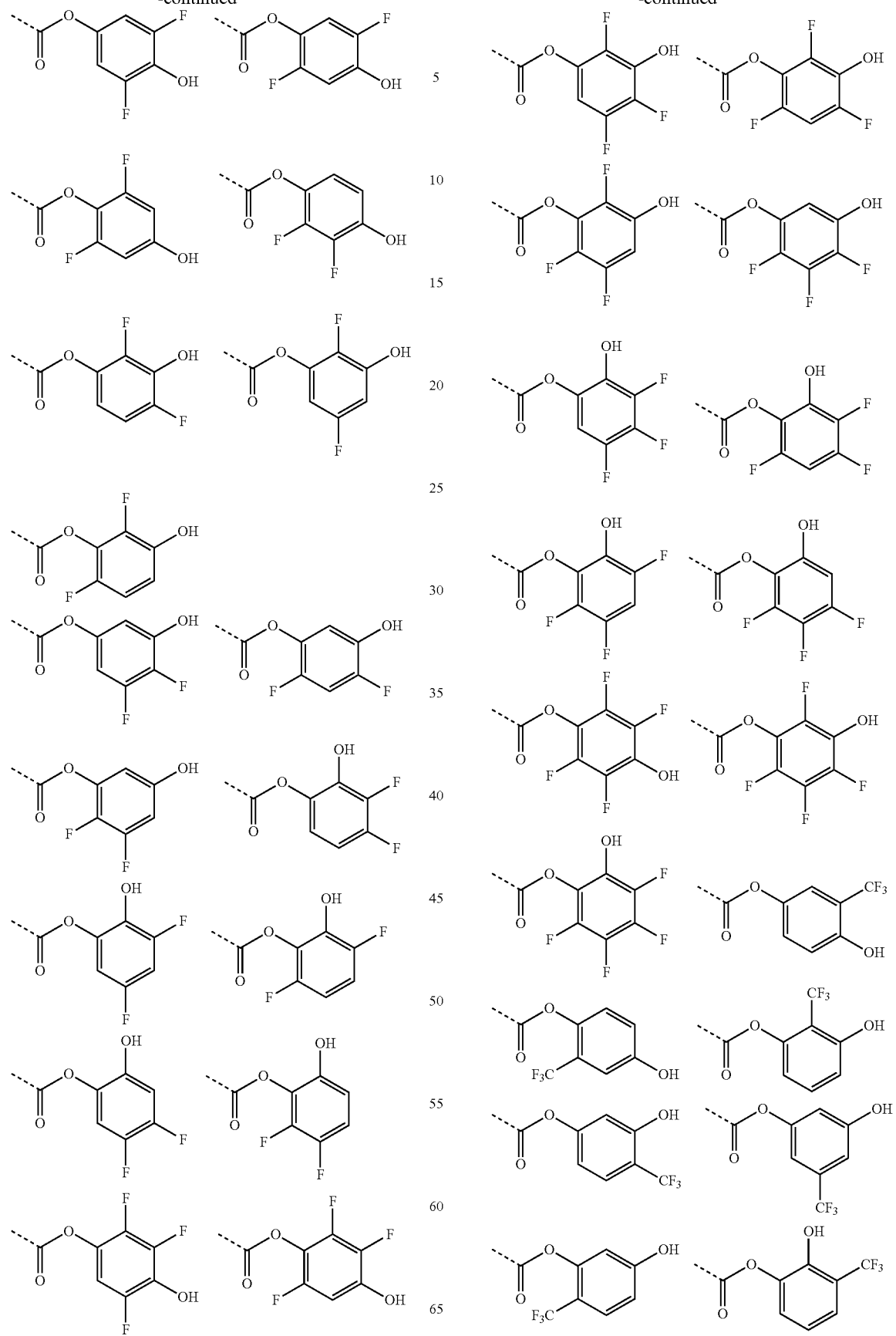

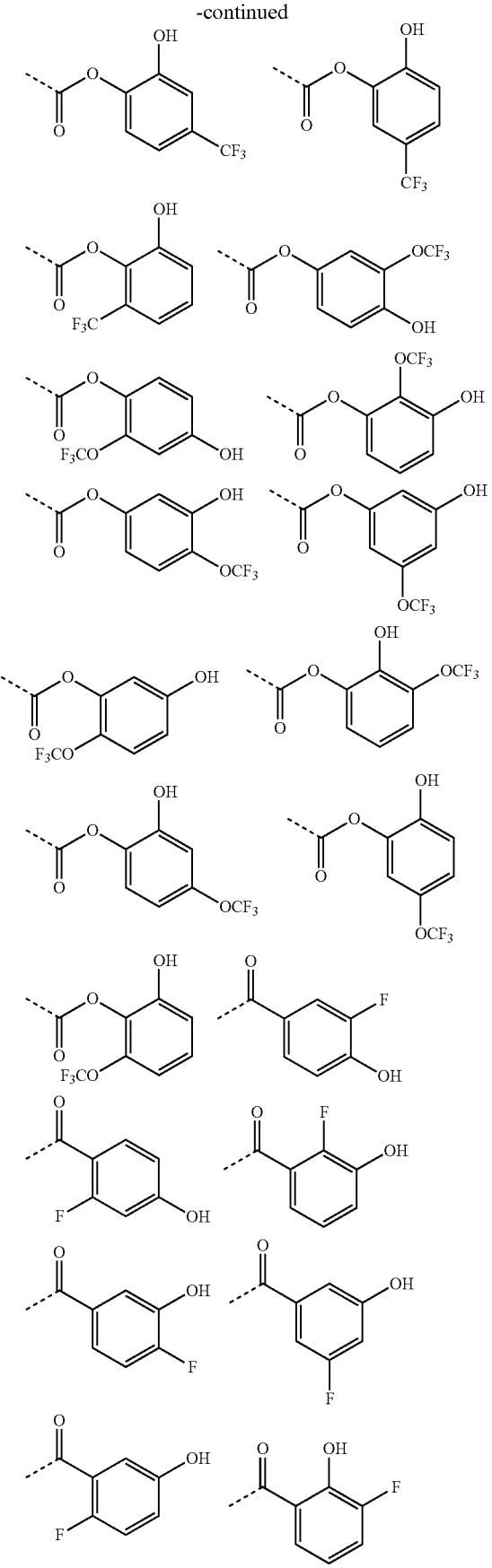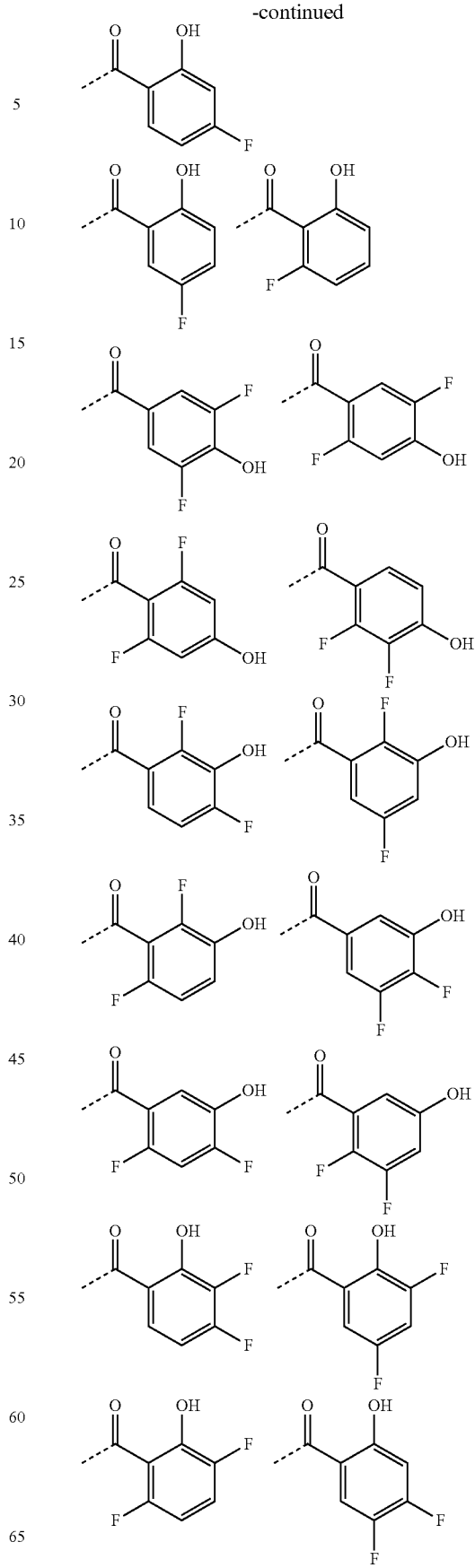

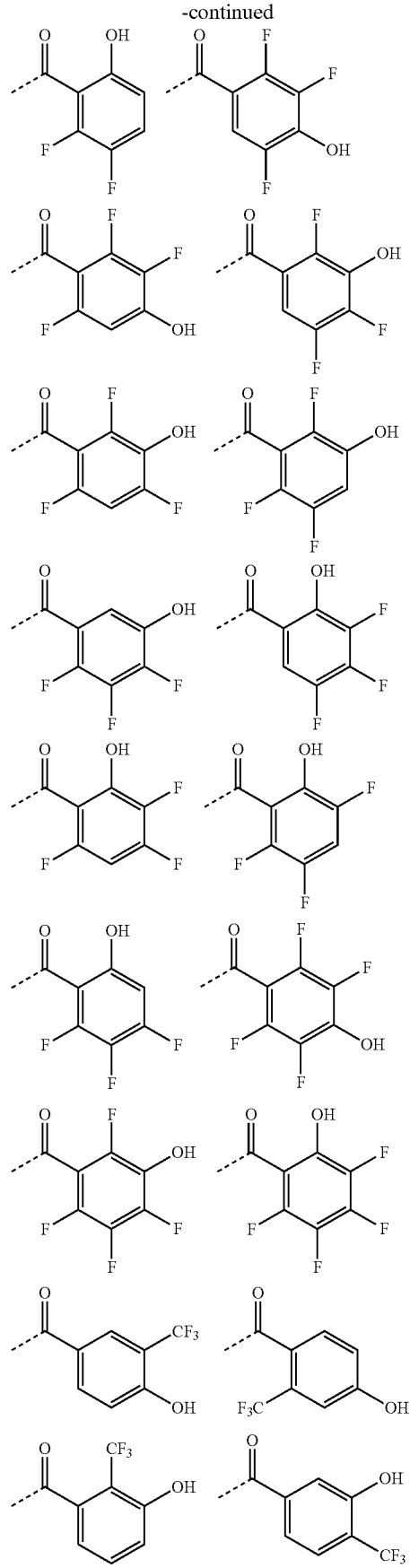
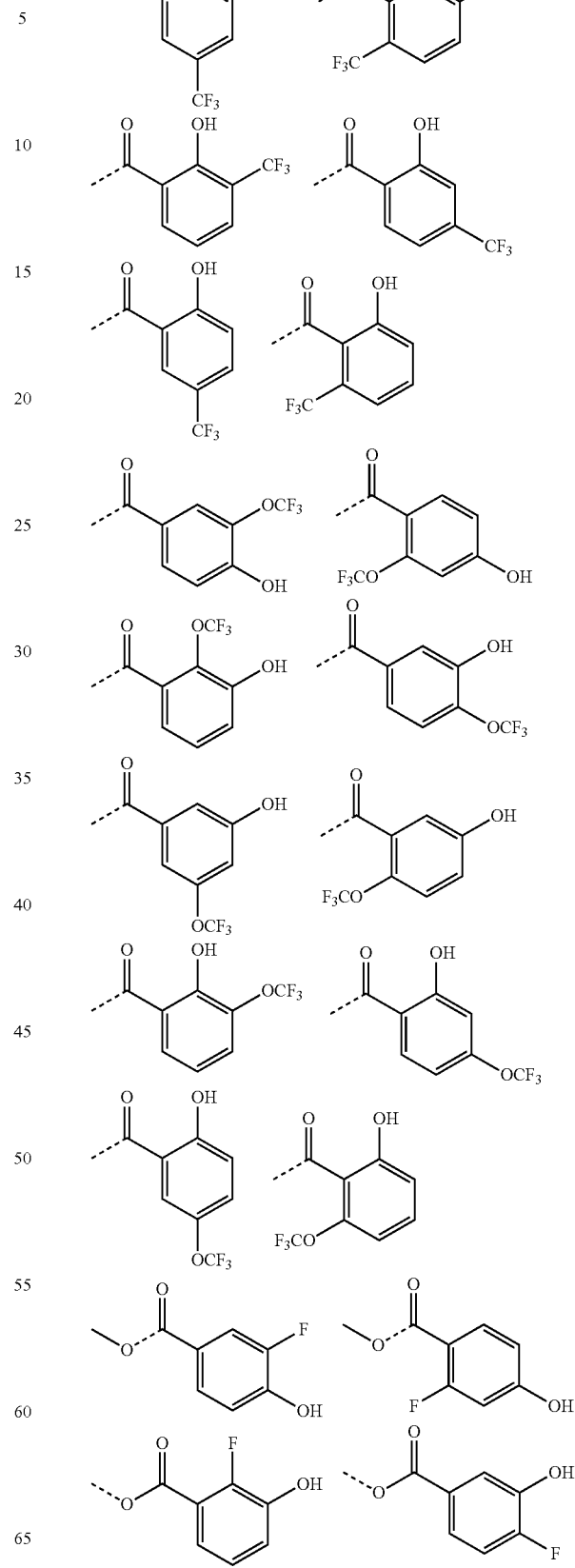

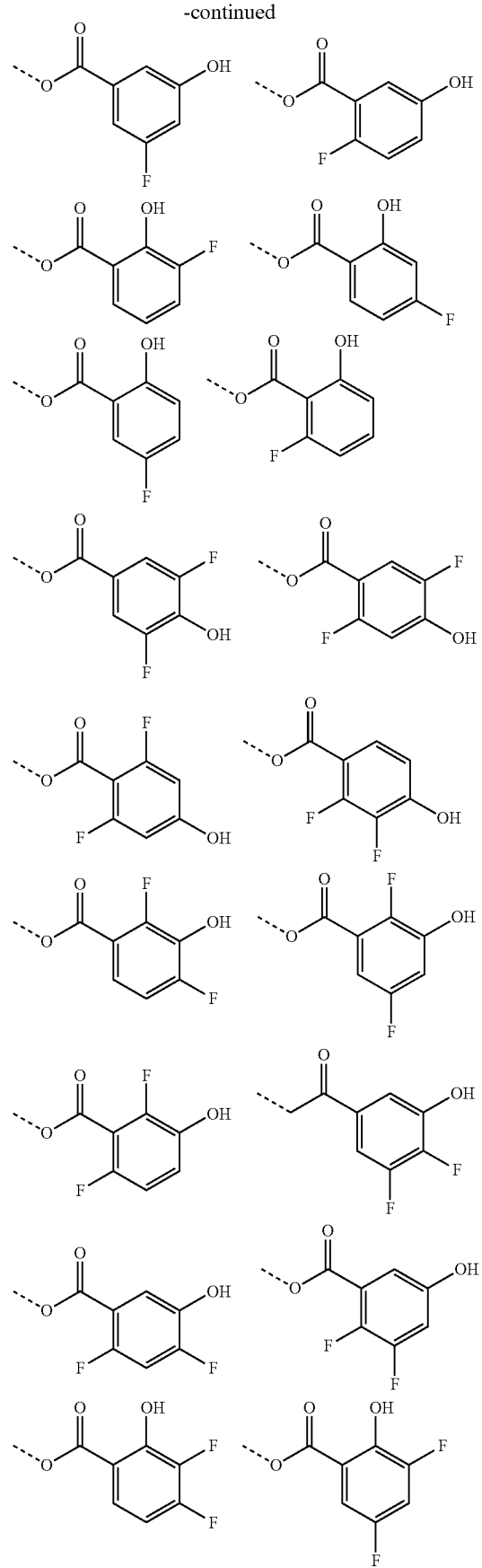
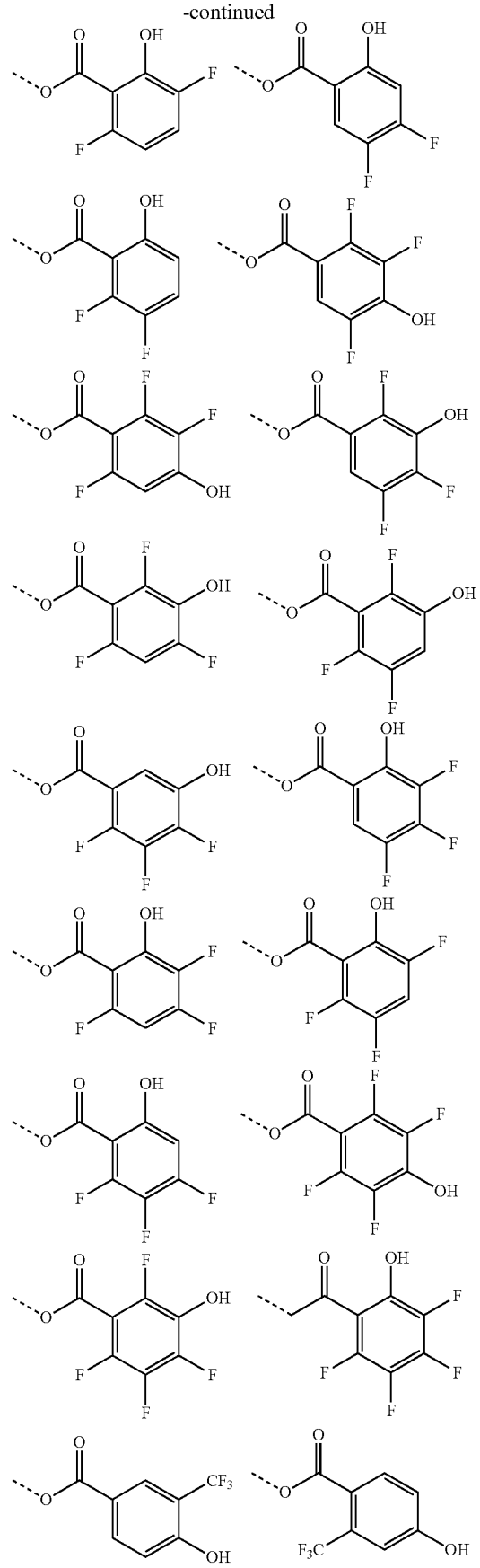

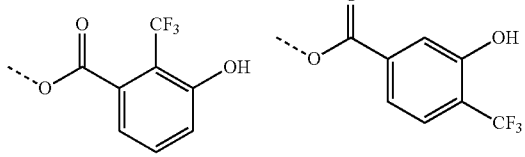
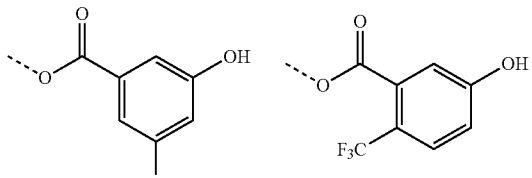
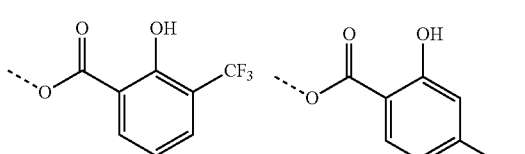
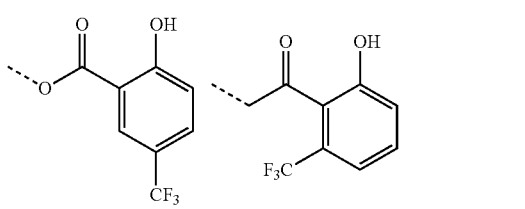
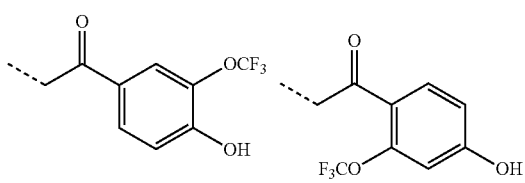
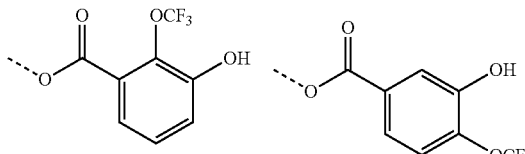
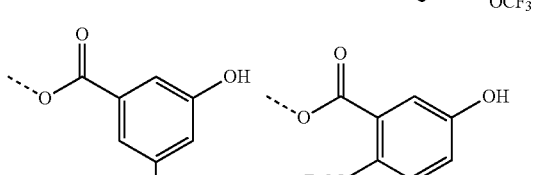
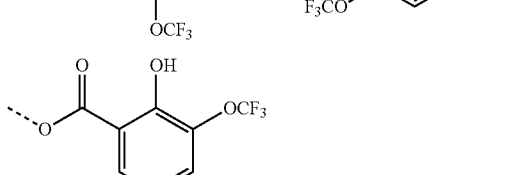
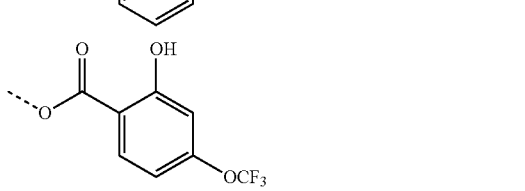

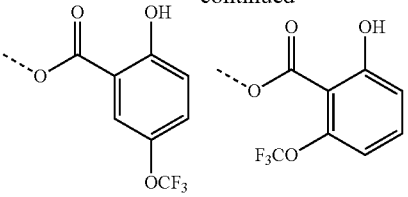
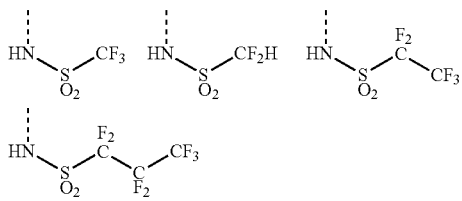

Specific examples of the weakly acidic functional group with a pKa of 5 to 11 include sulfonamide-containing groups shown below.

$$\text{HN-S(O}_2\text{)-CF}_3 \quad \text{HN-S(O}_2\text{)-CF}_2\text{H} \quad \text{HN-S(O}_2\text{)-CF}_2\text{-CF}_3$$

$$\text{HN-S(O}_2\text{)-CF}_2\text{-CF}_2\text{-CF}_3$$

A polyurethane containing such a weakly acidic functional group with a pKa of 5 to 11 can be obtained, for example, by reaction between a polyisocyanate and a polyol, polyamine, polycarboxylic acid, or the like having a weakly acidic functional group according to a known method such as one-shot method or prepolymer method. Preferably, prepolymer method is employed.

In the prepolymer method, a polyurethane is synthesized through steps of: (a) reacting a diisocyanate and a high-molecular-weight polyol with excess isocyanate groups to obtain a reaction mixture containing a prepolymer having an isocyanate group at a terminal; and (b) reacting the prepolymer with a low-molecular-weight diol, diamine, or dicarboxylic acid (chain extender) to polymerize the prepolymer. Further, a polyisocyanate having three or more reactive groups, or a polyol, polyamine, or polycarboxylic acid having three or more reactive groups, may be added to obtain a polyurethane having a crosslink structure.

Alternatively, after the polymerization in (b) is performed with excess amount of isocyanate groups, a capping agent having a reactive group (such as a hydroxyl group, an amino group, a carboxyl group) that can react with an isocyanate group may be added to introduce a functional group derived from the capping agent to the urethane terminal.

In the reactions of (a) and (b) described above, all or part of at least one of the high-molecular-weight polyol, the chain extender, and the capping agent is substituted with a compound containing a weakly acidic functional group with a pKa of 5 to 11, so that the weakly acidic functional group is introduced to the polyurethane.

In a case where the weakly acidic functional group can react with an isocyanate, a polyurethane may be formed while the weakly acidic functional group is protected with a suitable protective group; thereafter, the deprotection reaction is carried out, so that the polyurethane thus synthesize contains the weakly acidic functional group.

[Polyisocyanate]

Examples of the polyisocyanate as a constituent component of the polyurethane include: aliphatic and alicyclic polyisocyanates, such as ethylene diisocyanate, trimethylene diisocyanate, tetramethylene diisocyanate, pentamethylene diisocyanate, hexamethylene diisocyanate (HDI), octamethylene diisocyanate, nonamethylene diisocyanate, 2-methylpentane-1,5-diisocyanate, 3-methylpentane-1,5-diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecamethylene triisocyanate, 1,3,6-hexamethylene triisocyanate, 1,8-diisocyanato-4-isocyanatomethyloctane, 2,5,7-trimethyl-1,8-diisocyanato-5-isocyanatomethyloctane, bis(isocyanatoethyl) carbonate, bis (isocyanatoethyl)ether, 1,4-butylene glycol dipropyl ether-ω,ω'-diisocyanate, lysine isocyanatomethyl ester, lysine triisocyanate, 2-isocyanatoethyl-2,6-diisocyanate hexanoate, 2-isocyanatopropyl-2,6-diisocyanate hexanoate, bis(4-isocyanato-n-butylidene) pentaerythritol, 2,6-diisocyanatomethyl caproate, isophorone diisocyanate (IPDI), 1,3-cyclohexyl diisocyanate, 1,4-cyclohexyl diisocyanate, 1,3-bis(isocyanatomethyl)cyclohexane, 1,4-bis(isocyanatomethyl)cyclohexane, 1,3-bis(isocyanatoethyl)cyclohexane, 1,4-bis(isocyanatoethyl)cyclohexane, methylcyclohexane diisocyanate, 2,2'-dimethyldicyclohexylmethane diisocyanate, 4,4'-dicyclohexylmethane diisocyanate, dimer acid diisocyanate, 2,5-diisocyanatomethylbicyclo[2,2,1]-heptane, 2,6-diisocyanatomethylbicyclo[2,2,1]-heptane, 2-isocyanatomethyl-2-(3-isocyanatopropyl)-5-isocyanatomethylbicyclo-[2,2,1]-heptane, 2-isocyanatomethyl-2-(3-isocyanatopropyl)-6-isocyanatomethylbicyclo-[2,2,1]-heptane, 2-isocyanatomethyl-3-(3-isocyanatopropyl)-5-(2-isocyanatoethyl)-bicyclo-[2,2,1]-heptane, 2-isocyanatomethyl-3-(3-isocyanatopropyl)-6-(2-isocyanatoethyl)-bicyclo-[2,2,1]-heptane, 2-isocyanatomethyl-2-(3-isocyanatopropyl)-5-(2-isocyanatoethyl)-bicyclo-[2,2,1]-heptane, and 2-isocyanatomethyl-2-(3-isocyanatopropyl)-6-(2-isocyanatoethyl)-bicyclo-[2,2,1]-heptane; aromatic polyisocyanates, such as 2,4-tolylene diisocyanate or 2,6-tolylene diisocyanate and isomer mixture thereof (TDI), 4,4'-diphenylmethane diisocyanate or 2,4'-diphenylmethane diisocyanate and isomer mixture thereof (MDI), tolidine diisocyanate (TODI), para-phenylene diisocyanate, naphthalene diisocyanate (NDI), and 4,4'-dibenzyl diisocyanate; aromatic-aliphatic polyisocyanates, such as ortho-xylylene diisocyanate, meta-xylylene diisocyanate, para-xylylene diisocyanate, 1,3-tetramethylxylylene diisocyanate, and 1,4-tetramethylxylylene diisocyanate; polymers thereof prepared as urethane-modified products, biuret-modified products, carbodiimide-modified products, uretonimine-modified products, uretdione-modified products, isocyanurate-modified products, or allophanate-modified products; etc.

One of these polyisocyanates may be used, or two or more thereof may be used in combination.

[High-Molecular-Weight Polyol]

The high-molecular-weight polyol used as a constituent component of the polyurethane can be a polyol having a number-average molecular weight of 500 to 5,000 and containing two or more hydroxyl groups that can react with an isocyanate group. Examples of the high-molecular-weight polyol include polyether polyol, polyester polyol, polycarbonate polyol, acrylic polyol, polyolefin having a terminal hydroxyl group, silicone polyol, castor oil-based polyol, etc.

Examples of the polyether polyol include polyoxypropylene glycols, polyoxyethylene glycols, polyoxytetramethylene glycols, copolymers thereof, etc.

The polyoxypropylene glycols and polyoxyethylene glycols are alkylene-oxide addition polymers using a low-molecular-weight polyol, polyamine, or amino alcohol as an initiator. Examples of the low-molecular-weight polyol include: dihydric alcohols, such as ethylene glycol, 1,2-propanediol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, neopentyl glycol, 3-methyl-1,5-pentanediol, 3,3-dimethylolheptane, 2,2,2-trimethylpentanediol, 1,4-dihydroxy-2-butene, 2,6-dimethyl-1-octene-3,8-diol, diethylene glycol, triethylene glycol, dipropylene glycol, cyclohexane-1,3-diol, cyclohexane-1,4-diol, cyclohexane-1,3-dimethanol, cyclohexane-1,4-dimethanol, 1,3-adamantanedimethanol, dimer acid diol, 1,2-benzenediol, 1,3-benzenediol, 1,4-benzenediol, hydroquinone di(2-hydroxyethyl ether), bisphenol A, bis(R-hydroxyethyl)benzene, and xylylene glycol; trihydric alcohols, such as glycerin, trimethylolpropane, and triisopropanolamine; tetrahydric alcohols, such as pentaerythritol, α-methyl glucoside, and diglycerin; and polyhydric alcohols, such as sorbitol and sucrose. Examples of the low-molecular-weight amino alcohol include monoethanolamine, dimethanolamine, and triethanolamine. Examples of the low-molecular-weight polyamine include ethylenediamine, propylenediamine, butanediamine, pentamethylenediamine, hexamethylenediamine, isophorone diamine, piperazine, toluenediamine, metaphenylenediamine, diphenylmethanediamine, xylylenediamine, dimethylthiotoluenediamine, 4,4-methylenebis-o-chloroaniline, etc. One of these initiators may be used, or two or more thereof may be used in combination.

Further, when a low-molecular-weight polyol containing the weakly acidic functional group with a pKa of 5 to 11 is used, a polyether polyol containing the weakly acidic functional group can also be obtained. Note that such polyether polyol can be synthesized by performing the polymerization while protecting the weakly acidic functional group, followed by the deprotection.

Examples of the alkylene oxide include ethylene oxide, propylene oxide, butylene oxide, etc. One or a combination of two or more thereof can be used. Polyoxyalkylene polyol obtained from a combination of two or more kinds may have either block or random structure.

The polyoxytetramethylene glycol is a ring-opening polymerization product obtained through cationic polymerization of tetrahydrofuran (THF). Examples thereof include crystalline polyoxytetramethylene glycol, amorphous polyoxytetramethylene glycol obtained by copolymerizing THE with alkyl-substituted tetrahydrofuran, such as 3-methyltetrahydrofuran, or aforementioned dihydric alcohols; etc.

Examples of the polyester polyol include polymerization condensates between any of the aforementioned low-molecular-weight polyols and polyhydric carboxylic acid or oligomer acid; and ring-opening polymers of lactone or lactide using the low-molecular-weight polyol as an initiator.

Examples of the polyhydric carboxylic acid include oxalic acid, malonic acid, succinic acid, glutaric acid, adipic acid, pimelic acid, suberic acid, glutaconic acid, azelaic acid, sebacic acid, 1,1-dimethyl-1,3-dicarboxypropane, 3-methyl-3-ethylglutaric acid, 1,4-cyclohexyldicarboxylic acid, hexahydrophthalic acid, maleic acid, fumaric acid, itaconic acid, muconic acid, α-hydromuconic acid, β-hydromuconic acid, phthalic acid, ortho-phthalic acid, terephthalic acid, isophthalic acid, toluenedicarboxylic acid, naphthalenedicarboxylic acid, HET acid, dimer acid, hydrogenated dimer acid. It is also possible to use a derivative, acid anhydride, or acid halide thereof, for example.

Examples of the lactone include β-propiolactone, β-butyrolactone, γ-butyrolactone, γ-valerolactone, δ-valerolactone, ε-caprolactone, etc. Examples of the lactide include L-lactide and D-lactide.

One kind of the low-molecular-weight polyol, polyhydric carboxylic acid, oligomer acid, lactone, or lactide, which are constituent components of the polyester polyol, may be used, or two or more kinds of each constituent component may be used in combination.

Further, it is also possible to use polyester-amide polyol obtained by substituting part of the low-molecular-weight polyol of the polyester polyol with the aforementioned low-molecular-weight polyamine or amino alcohol.

Examples of the polycarbonate polyol include polymerization condensates between any of the aforementioned polyols and a carbonate compound.

Examples of the carbonate compound include dimethyl carbonate, diethyl carbonate, ethylene carbonate, propylene carbonate, diphenyl carbonate, dinaphthyl carbonate, dianthryl carbonate, diphenanthryl carbonate, diindanyl carbonate, tetrahydronaphthyl carbonate, etc.

One kind of the low-molecular-weight polyol or carbonate compound, which are constituent components of the polycarbonate polyol may be used, or two or more kinds of each constituent component may be used in combination.

Examples of the acrylic polyol include copolymers obtained by copolymerizing hydroxy group-containing (meth)acrylate with vinyl monomer.

Examples of the hydroxyl group-containing (meth)acrylate include 2-hydroxyethyl (meth)acrylate, hydroxypropyl (meth)acrylate, hydroxybutyl (meth)acrylate, 3-hydroxy-2,2-dimethylpropyl acrylate, 2,2-dihydroxymethylbutyl (meth)acrylate, pentaerythritol tri(meth)acrylate, polyhydroxyalkyl maleate, polyhydroxyalkyl fumarate, etc. One of these (meth)acrylates may be used singly, or two or more thereof may be used in combination.

Examples of the vinyl monomer include: (meth)acrylic esters, such as methyl(meth)acrylate, ethyl(meth)acrylate, propyl(meth)acrylate, isopropyl(meth)acrylate, butyl(meth)acrylate, isobutyl(meth)acrylate, s-butyl(meth)acrylate, t-butyl(meth)acrylate, pentyl(meth)acrylate, isopentyl (meth)acrylate, hexyl(meth)acrylate, 2-ethylhexyl(meth) acrylate, octyl(meth)acrylate, nonyl(meth)acrylate, isononyl (meth)acrylate, decyl(meth)acrylate, dodecyl(meth)acrylate, cyclohexyl(meth)acrylate, phenyl(meth)acrylate, benzyl (meth)acrylate, allyl(meth)acrylate, ethylene glycol di(meth)acrylate, butylene glycol di(meth)acrylate, hexanediol di(meth)acrylate, and oligo ethylene glycol di(meth)acrylate; aromatic vinyls, such as styrene, vinyltoluene, and α-methylstyrene; vinyl cyanides, such as (meth)acrylonitrile; carboxyl group-containing vinyl monomers, such as fumaric acid, maleic acid, and itaconic acid, or alkyl esters thereof; isocyanate group-containing monomers, such as 3-(2-isocyanato-2-propyl)-α-methylstyrene; fluorine-containing vinyl monomers, such as tetrafluoroethylene, chlorotrifluoroethylene, trichlorofluoroethylene, hexafluoropropylene, vinylidene fluoride, vinyl fluoride, and trifluoromethyltrifluoroethylene; silicone monomers, such as γ-(meth)acryloxypropyltrimethoxysilane; etc. One of these monomers may be used, or two or more thereof may be used in combination.

Examples of the polyolefin having a terminal hydroxyl group include compounds obtained by attaching a hydroxyl group to a terminal of one or more olefin polymers. Examples of the olefin include ethylene, propylene, butadiene, isoprene, styrene, acrylonitrile, vinyl ether, and vinyl acetate. Further, part of these structures may be substituted with a halogen, such as fluorine, chlorine, or bromine.

Examples of the silicone polyol include vinyl group-containing silicone compounds obtained by polymerizing γ-methacryloxypropyltrimethoxysilane or the like; and polysiloxanes having at least one terminal hydroxyl group per molecule, such as α,ω-dihydroxypolydimethylsiloxane and α,ω-dihydroxypolydiphenylsiloxane.

Examples of the vegetable oil-based polyol include hydroxyl group-containing vegetable oils, such as castor oil and coconut oil; ester-modified castor oil polyol, dehydrated castor oil, partially dehydrated castor oil, and hydrogenated castor oil, which can be obtained from reaction product between castor oil fatty acid and polyol; etc.

The high-molecular-weight polyol has a number-average molecular weight in a range of preferably 500 or more and 5,000 or less, more preferably 1,000 or more and 3,000 or less, further preferably 1,000 or more and 2,000 or less.

When the number-average molecular weight of the high-molecular-weight polyol is at the lower limit or more, it is possible to suppress excessive increase in the urethane group concentration in the polyurethane, increase in the hardness due to this concentration increase, and decrease in properties such as stretchability. Meanwhile, when the number-average molecular weight is at the upper limit or less, it is possible to suppress excessive decrease in the urethane group concentration, prevent the strength attributable to the urethane bond from decreasing, and achieve both strength and stretchability at appropriate levels.

The high-molecular-weight polyol is preferably bifunctional polyol or trifunctional polyol, more preferably bifunctional polyol.

[Chain Extender]

Examples of the chain extender to be employed include: dihydric alcohols, such as ethylene glycol, 1,2-propanediol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, neopentyl glycol, 3-methyl-1,5-pentanediol, 3,3-dimethylolheptane, 2,2,2-trimethylpentanediol, 1,4-dihydroxy-2-butene, 2,6-dimethyl-1-octene-3,8-diol, diethylene glycol, triethylene glycol, dipropylene glycol, cyclohexane-1,3-diol, cyclohexane-1,4-diol, cyclohexane-1,3-dimethanol, cyclohexane-1,4-dimethanol, 1,3-adamantanedimethanol, dimer acid diol, 1,2-benzenediol, 1,3-benzenediol, 1,4-benzenediol, hydroquinone di(2-hydroxyethyl ether), bisphenol A, bis(β-hydroxyethyl)benzene, and xylylene glycol; amines, such as ethanolamine, dimethanolamine, triethanolamine, ethylenediamine, propylenediamine, butanediamine, pentamethylenediamine, hexamethylenediamine, isophorone diamine, piperazine, toluenediamine, metaphenylenediamine, diphenylmethanediamine, xylylenediamine, dimethylthiotoluenediamine, and 4,4-methylenebis-o-chloroaniline; etc.

Further, a polyol shown by the following general formula (3a) or (3b) may be used as a chain extender to introduce the weakly acidic functional group to a side chain of the polyurethane. The chain extender to be employed may be the polyol shown by (3a) or (3b) alone, or may be a combination with the above-listed chain extender(s).

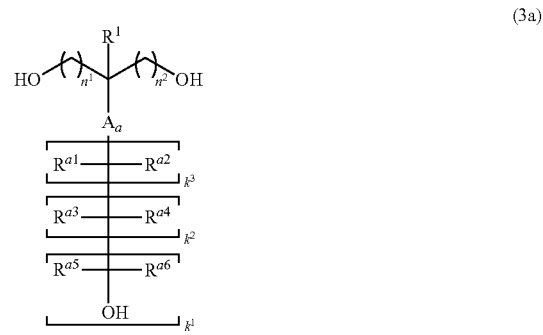

-continued

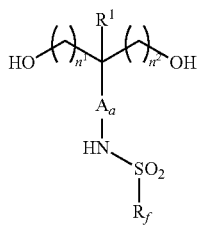
(3b)

In the formulae, $R^{a1}$, $R^{a2}$, $R^{a3}$, $R^{a4}$, $R^{a5}$, and $R^{a6}$ each independently represent a hydrogen atom, a fluorine atom, an oxygen atom, a linear, branched, or cyclic hydrocarbon group, a perfluoroalkyl group, a perfluoroalkylene group, or a perfluoroalkoxy group. Each of these groups has 1 to 6 carbon atoms. At least one of $R^{a1}$, $R^{a2}$, $R^{a3}$, $R^{a4}$, $R^{a5}$, and $R^{a6}$ is a fluorine atom, a perfluoroalkyl group, a perfluoroalkylene group, or a perfluoroalkoxy group. $R^{a1}$ and $R^{a2}$, $R^{a3}$ and $R^{a4}$, $R^{a5}$ and $R^{a6}$, $R^{a1}$ and $R^{a3}$, $R^{a1}$ and $R^{a5}$, or $R^{a3}$ and $R^{a5}$, are optionally bonded to each other together with a carbon atom bonded therewith to form a non-aromatic ring having 3 to 8 carbon atoms. Some —$CH_2$— constituting $R^{a1}$, $R^{a2}$, $R^{a3}$, $R^{a4}$, $R^{a5}$, or $R^{a6}$ is optionally substituted with an oxygen atom to form a hetero ring. $k^1$ represents an integer of 1 or 2. $k^2$ and $k^3$ each represent an integer of 0 to 10. $R_f$ represents a fluorine atom, or a linear, branched, or cyclic fluorinated hydrocarbon group having 1 to 10 carbon atoms. $R^1$, $A_a$, $n^1$, and $n^2$ are as defined above.

The polyurethane containing the structure shown by any of the general formula (2a) to (2c) is successfully obtained by using such a chain extender.

Specific examples of the linear, branched, or cyclic divalent hydrocarbon group having 1 to 20 carbon atoms, which is represented by $A_a$, include the following.

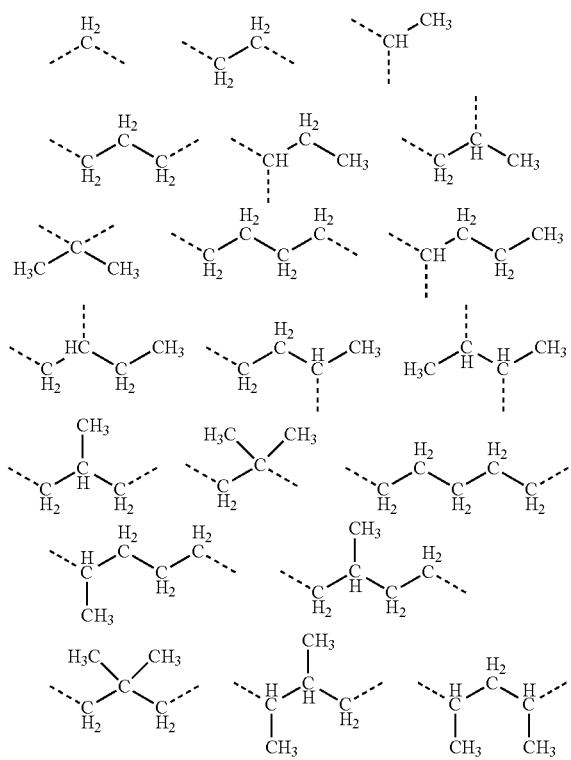

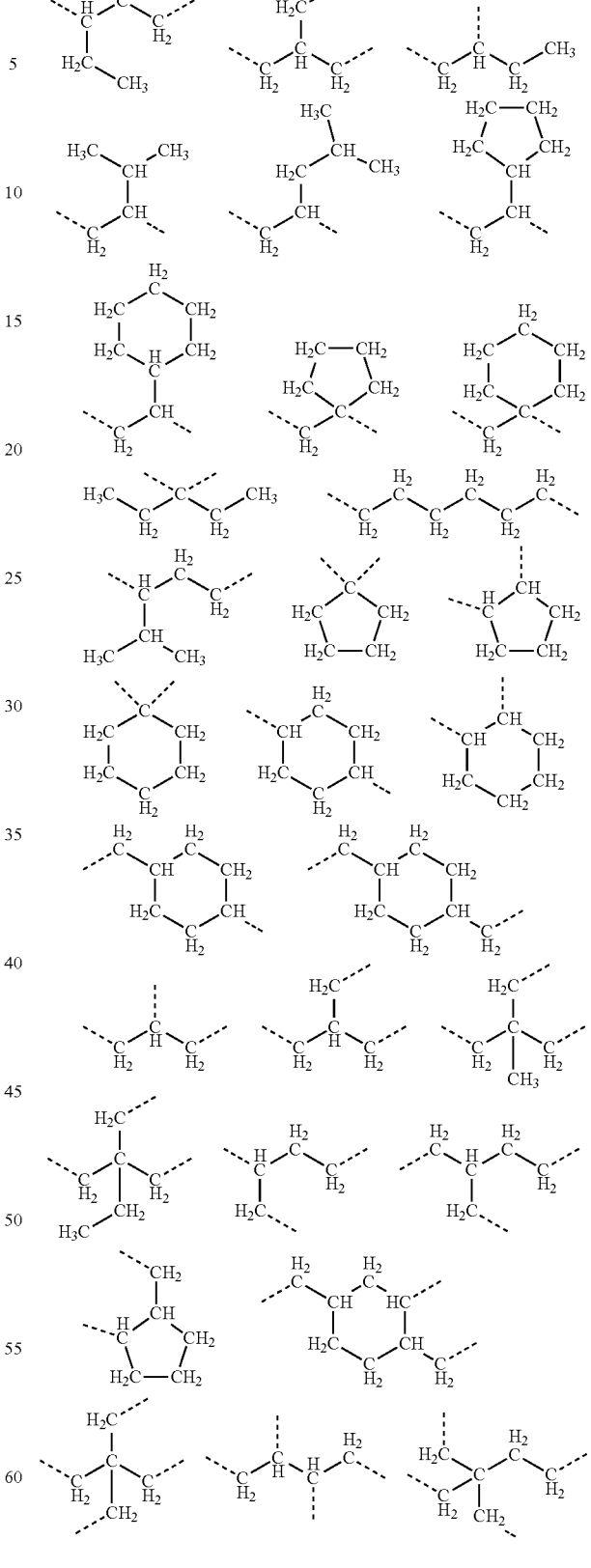

The examples can further include ones in which any —$CH_2$— in $A_a$ is substituted with —O—, —C(=O)—, —C(=O)O—, —$C_6H_4$—, or —$NR^5$—C(=O)— ($R^5$ represents a hydrogen atom, or a linear or branched alkyl group having 1 to 4 carbon atoms. $R^1$, $R_f$, $n^1$, and $n^2$ are as defined above).

The unit containing the weakly acidic functional group in the general formula (3a) can be shown by the following (3c). Further, specific examples of the unit include fluoroalcohol-containing groups as follows.

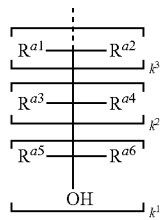
(3c)

In the formula, $k^1$, $k^2$, and $k^3$ are as defined above.

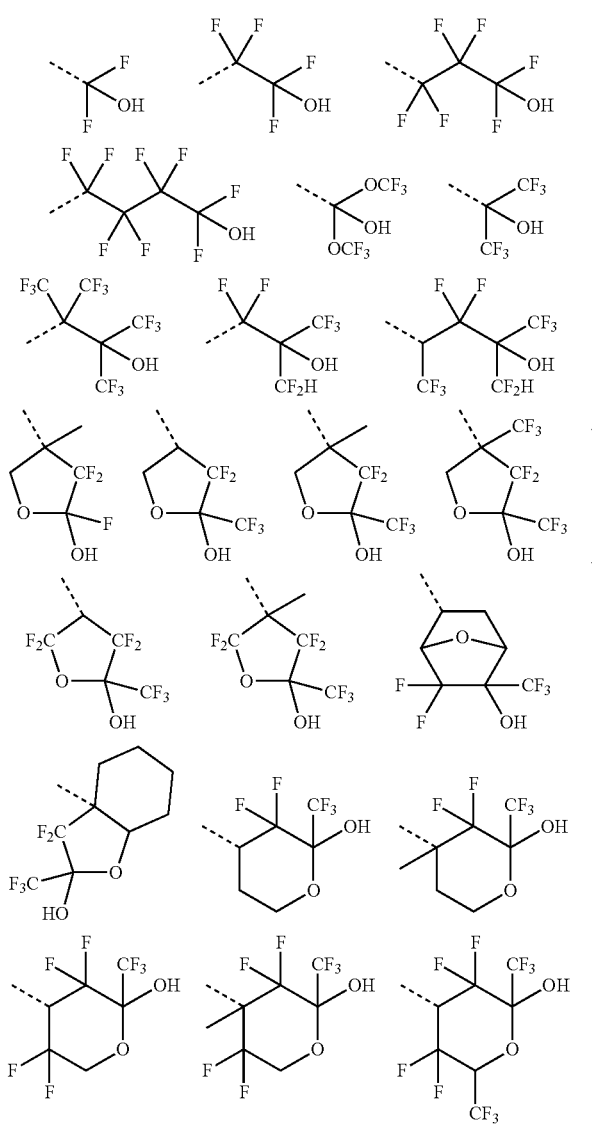

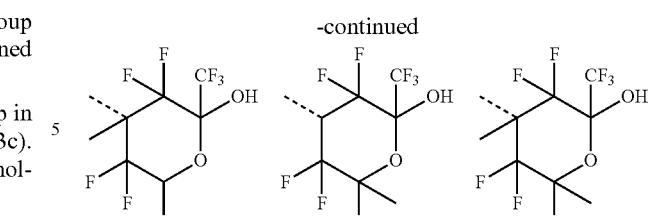
-continued

Preferable specific examples of the polyol shown by the general formula (3a) include the following, but are not limited thereto.

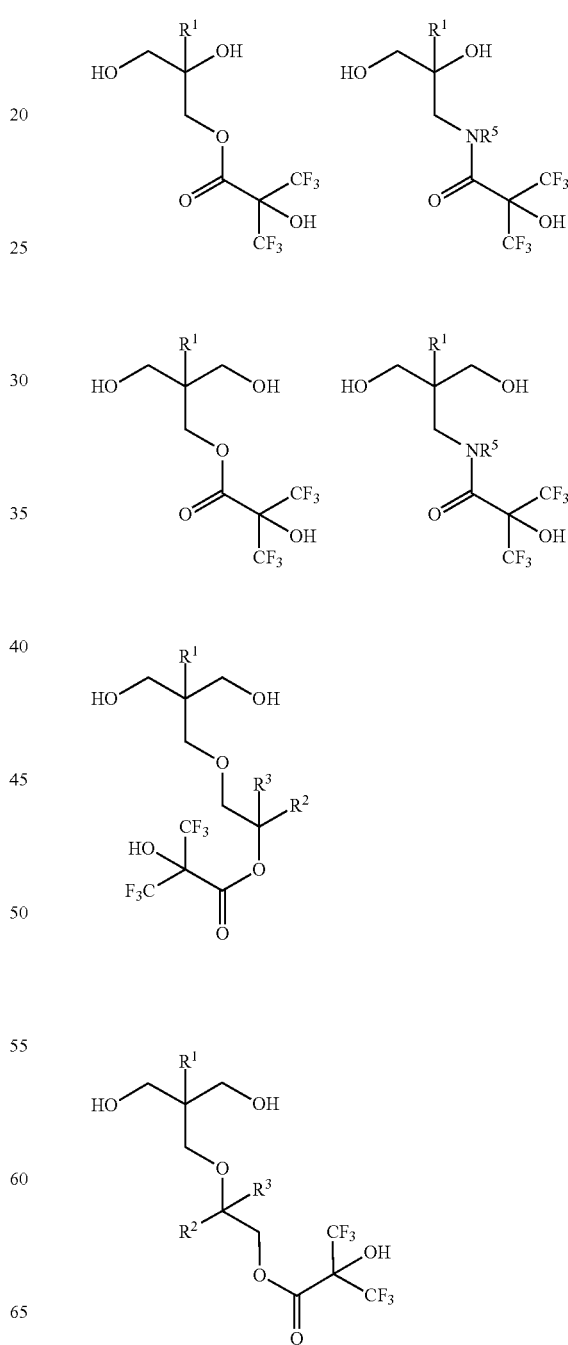

-continued
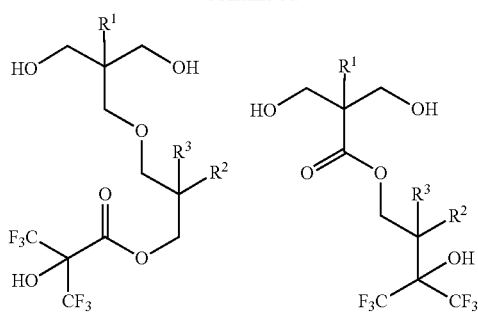
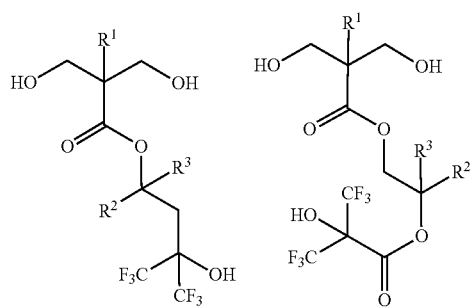
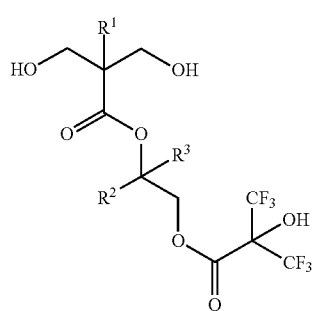
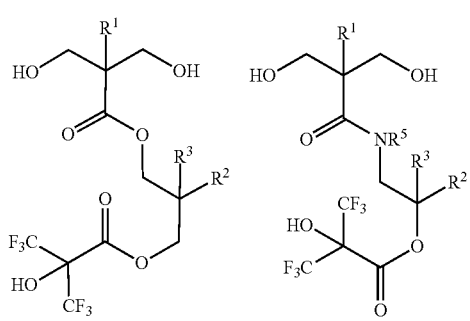
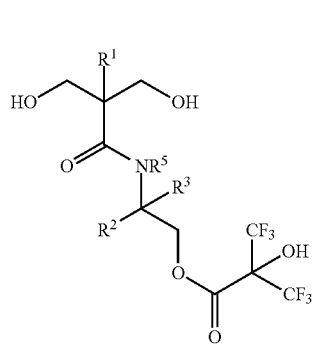
-continued
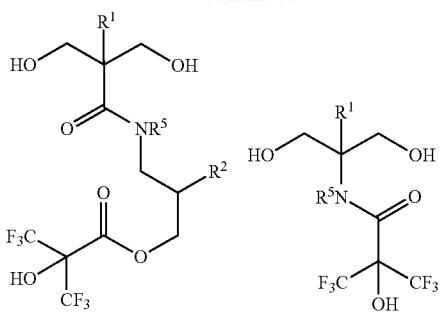
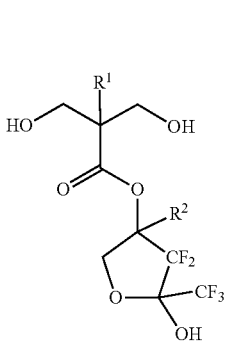
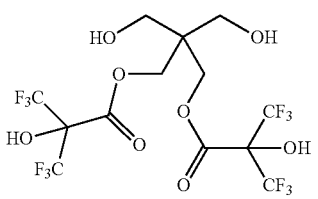
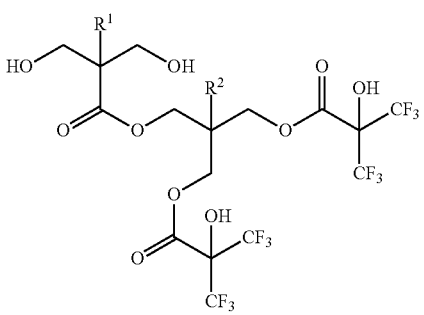
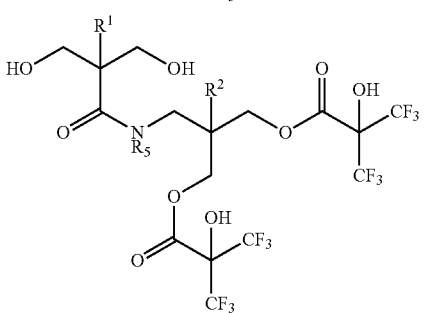

In the formulae, $R^1$, $R^2$, $R^3$, and $R^5$ are as defined above.
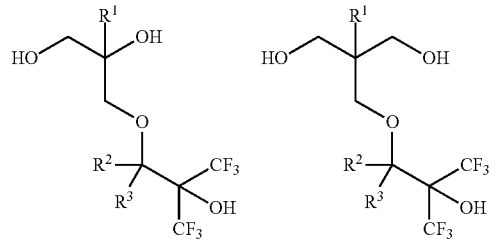
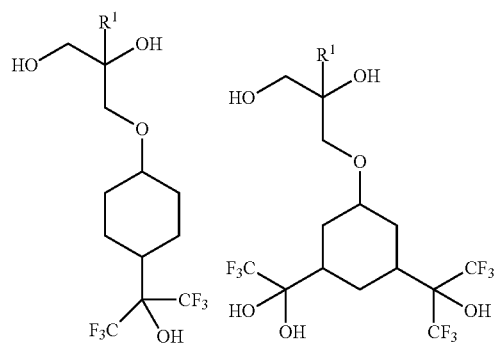
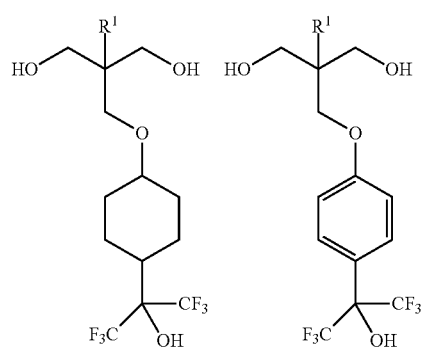
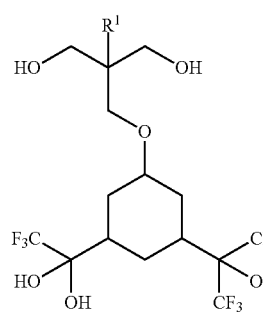
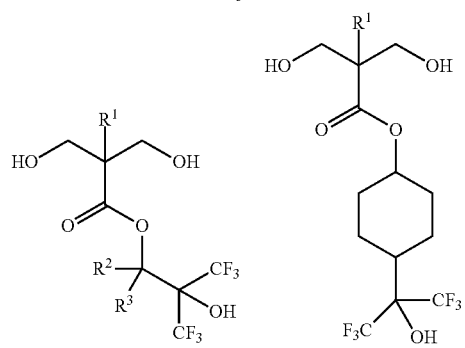
-continued
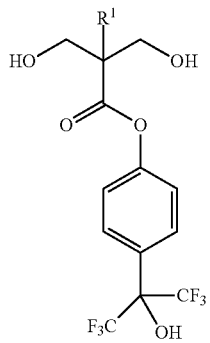
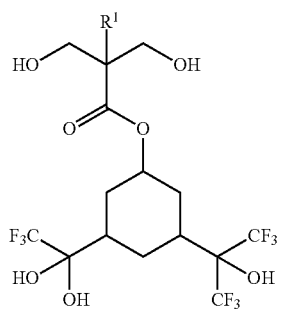
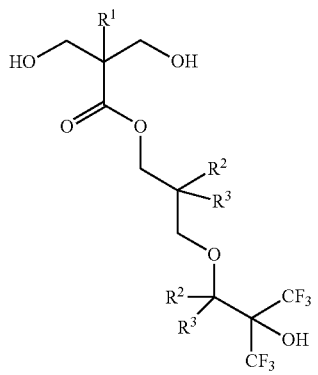
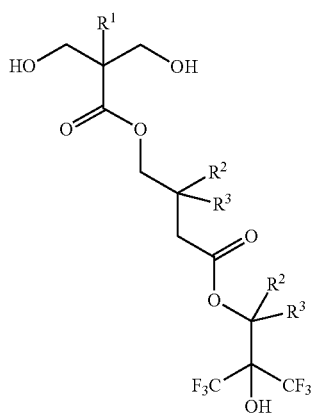
In the formulae, $R^1$, $R^2$, and $R^3$ are as defined above.
Specific examples of the polyol shown by the general formula (3b) include the following, but are not limited thereto.

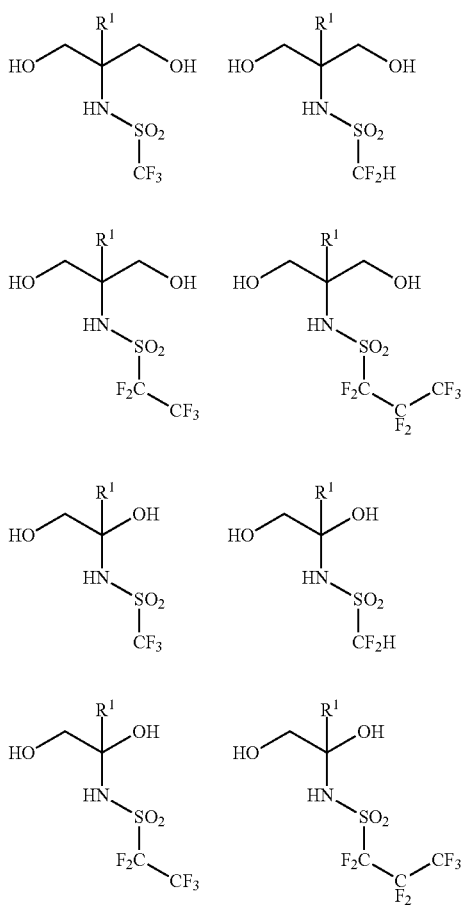

In the formulae, $R^1$ is as defined above.

Additionally, a polyol shown by any of the following general formulae (4a) to (4c) can also be used as a chain extender. The chain extender to be employed may be the polyol shown by any of (4a) to (4c) alone, or may be a combination with the above-described chain extender(s).

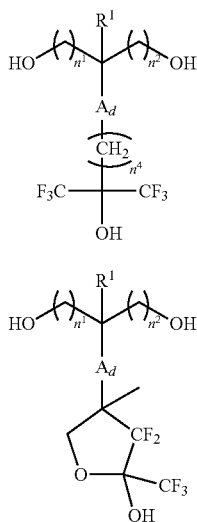

(4a)

(4b)

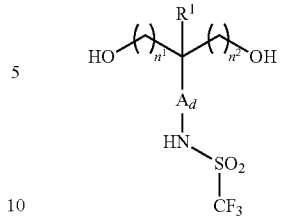

(4c)

In the formulae, $A_d$ represents a single bond, or a linear, branched, or cyclic divalent hydrocarbon group having 1 to 20 carbon atoms. —$CH_2$— constituting $A_d$ is optionally substituted with —O—, —C(=O)—, —C(=O)O—, —$C_6H_4$—, or —$NR^5$—C(=O)—. $R^1$, $n^1$, $n^2$, and $n^4$ are as defined above.

Specific examples of the polyols shown by the general formulae (4a) to (4c) include the following, but are not limited thereto.

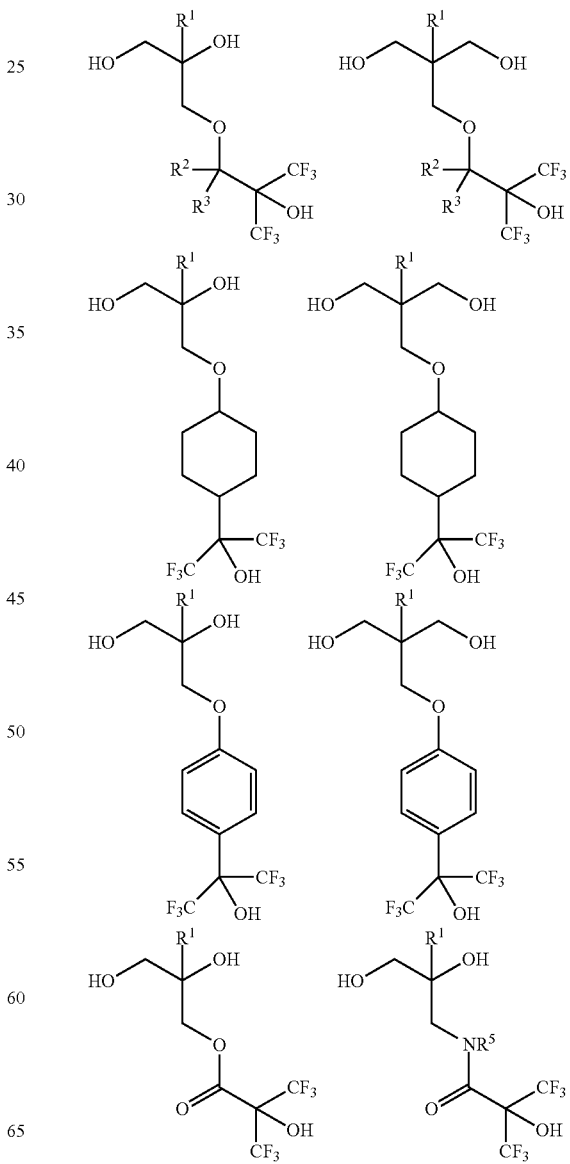

-continued
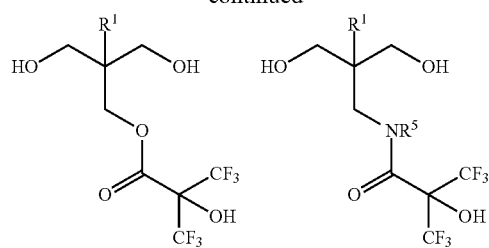
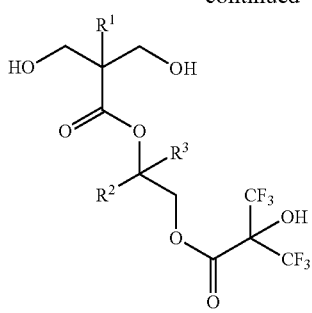
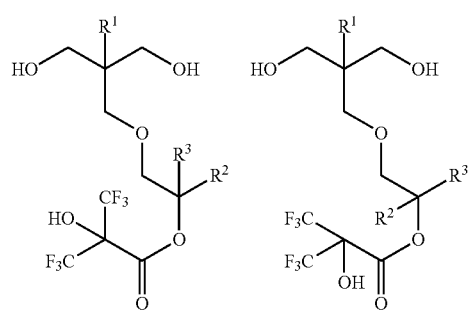
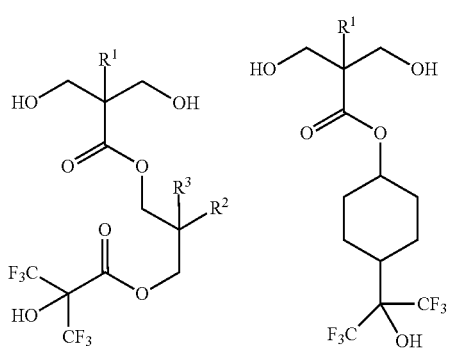
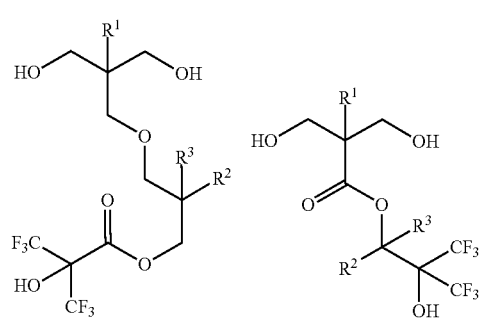
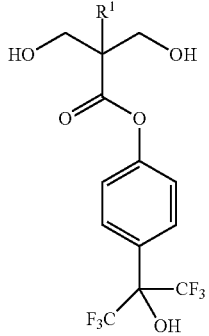
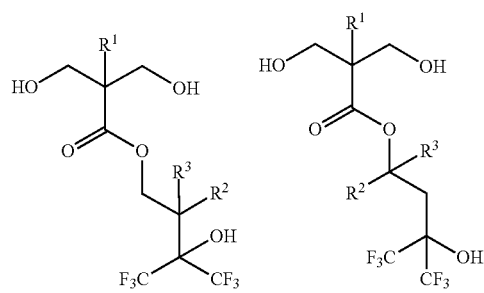
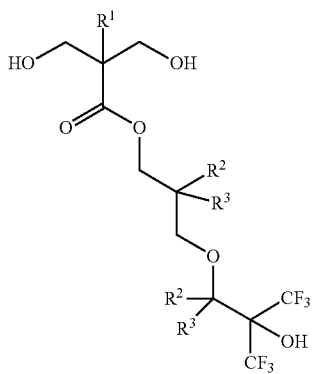

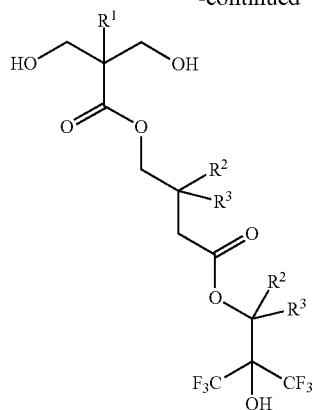
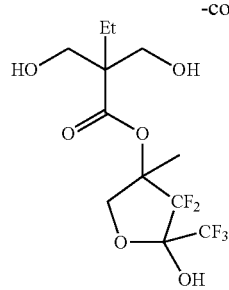
In the formulae, Me represents a methyl group, and Et represents an ethyl group.
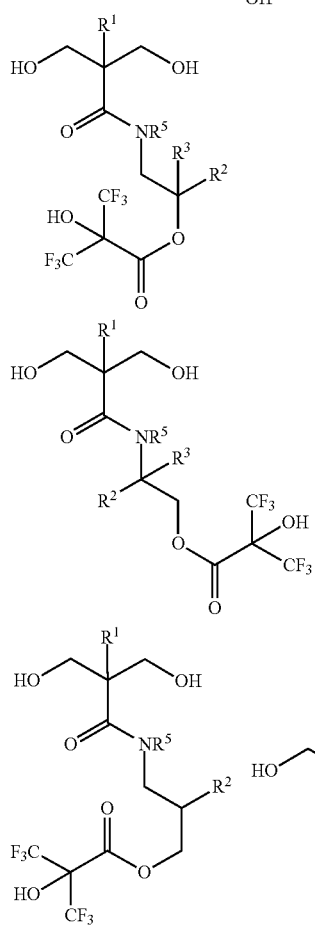
In the formulae, $R^1$, $R^2$, $R^3$, and $R^5$ are as defined above.
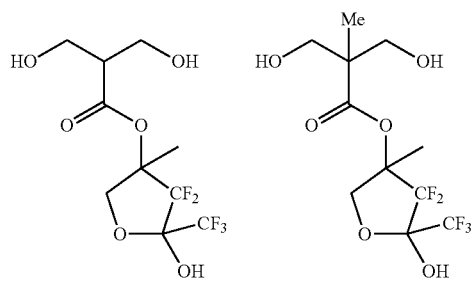
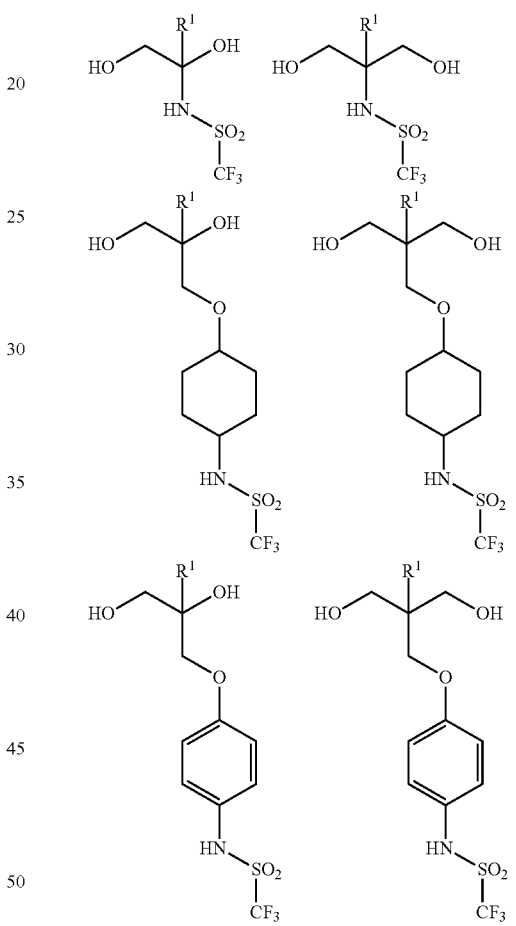
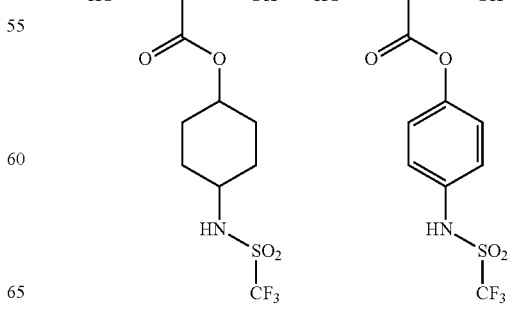
In the formulae, $R^1$ is as defined above.

Further, a polyol shown by the following general formula (5) can also be used as a chain extender. The chain extender to be employed may be the polyol shown by (5) alone, or may be a combination with the above-described chain extender(s).

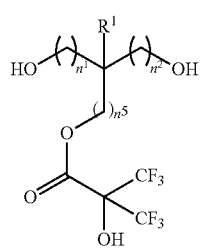
(5)

In the formula, $n^5$ represents an integer of 0 to 10, and $R^1$, $n^1$, and $n^2$ are as defined above.

Specific examples of the polyol shown by the general formula (5) include the following, but are not limited thereto.

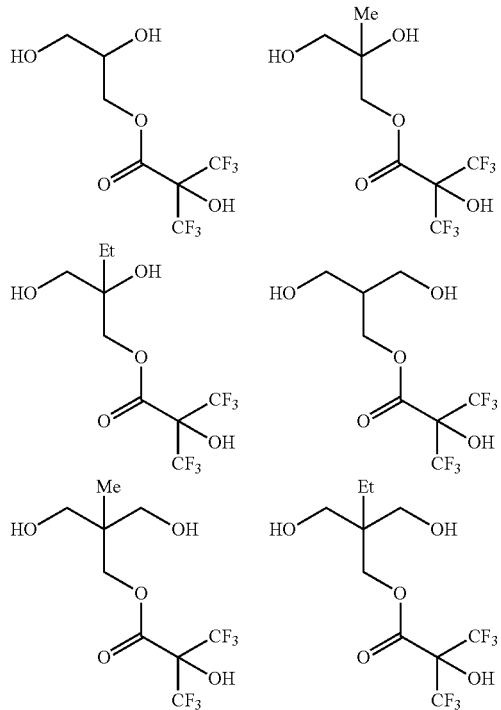

In the formulae, Me represents a methyl group, and Et represents an ethyl group.

The chain extender having a weakly acidic functional group is used in an amount of preferably 5 to 50 mass %, more preferably 20 to 40 mass %, relative to a total amount of the constituent components of the urethane.

[Crosslinking Agent]

A crosslinking agent may be used. Examples thereof include trihydric alcohols, such as glycerin, trimethylolpropane, and triisopropanolamine; and polyhydric alcohols, such as pentaerythritol, α-methyl glucoside, and diglycerin.

The crosslinking agent is added in an amount within preferably 0 to 5 mass %, more preferably 0 to 3 mass %, relative to the total amount of the constituent components of the urethane.

When the crosslinking agent is added in an amount at this upper limit or less, the strength does not increase excessively, and the flexibility and stretchability would not be impaired. Thus, the crosslinking agent is suitably used in a conductive paste composition containing the inventive polyurethane.

[Organic Solvent]

The polyurethane is synthesized by bulk polymerization or solution polymerization. Examples of an organic solvent used in the solution polymerization include: aromatic hydrocarbon solvents, such as toluene, xylene, cumene, 1,2,3-trimethylbenzene, 1,2,4-trimethylbenzene, 1,3,5-trimethylbenzene, styrene, α-methylstyrene, butylbenzene, sec-butylbenzene, isobutylbenzene, cymene, diethylbenzene, 2-ethyl-p-xylene, 2-propyltoluene, 3-propyltoluene, 4-propyltoluene, 1,2,3,5-tetramethyltoluene, 1,2,4,5-tetramethyltoluene, tetrahydronaphthalene, 4-phenyl-1-butene, tert-amylbenzene, amylbenzene, 2-tert-butyltoluene, 3-tert-butyltoluene, 4-tert-butyltoluene, 5-isopropyl-m-xylene, 3-methylethylbenzene, tert-butyl-3-ethylbenzene, 4-tert-butyl-o-xylene, 5-tert-butyl-m-xylene, tert-butyl-p-xylene, 1,2-diisopropylbenzene, 1,3-diisopropylbenzene, 1,4-diisopropylbenzene, dipropylbenzene, pentamethylbenzene, hexamethylbenzene, hexylbenzene, and 1,3,5-triethylbenzene; aliphatic hydrocarbon solvents, such as n-heptane, isoheptane, n-hexane, octane, 3-methylhexane, 2,3-dimethylpentane, 3-ethylpentane, 1,6-heptadiene, 5-methyl-1-hexyne, norbornane, norbornene, dicyclopentadiene, 1-methyl-1,4-cyclohexadiene, 1-heptyne, 2-heptyne, cycloheptane, cycloheptene, 1,3-dimethylcyclopentane, ethylcyclopentane, cyclohexane, methylcyclohexane, 1-methyl-1-cyclohexene, 3-methyl-1-cyclohexene, methylenecyclohexane, 4-methyl-1-cyclohexene, 2-methyl-1-hexene, 2-methyl-2-hexene, 1-heptene, 2-heptene, 3-heptene, n-octane, 2,2-dimethylhexane, 2,3-dimethylhexane, 2,4-dimethylhexane, 2,5-dimethylhexane, 3,3-dimethylhexane, 3,4-dimethylhexane, 3-ethyl-2-methylpentane, 3-ethyl-3-methylpentane, 2-methylheptane, 3-methylheptane, 4-methylheptane, 2,2,3-trimethylpentane, 2,2,4-trimethylpentane, cyclooctane, cyclooctene, 1,2-dimethylcyclohexane, 1,3-dimethylcyclohexane, 1,4-dimethylcyclohexane, ethylcyclohexane, vinylcyclohexane, isopropylcyclopentane, 2,2-dimethyl-3-hexene, 2,4-dimethyl-1-hexene, 2,5-dimethyl-1-hexene, 2,5-dimethyl-2-hexene, 3,3-dimethyl-1-hexene, 3,4-dimethyl-1-hexene, 4,4-dimethyl-1-hexene, 2-ethyl-1-hexene, 2-methyl-1-heptene, 1-octene, 2-octene, 3-octene, 4-octene, 1,7-octadiene, 1-octyne, 2-octyne, 3-octyne, 4-octyne, n-nonane, 2,3-dimethylheptane, 2,4-dimethylheptane, 2,5-dimethylheptane, 3,3-dimethylheptane, 3,4-dimethylheptane, 3,5-dimethylheptane, 4-ethylheptane, 2-methyloctane, 3-methyloctane, 4-methyloctane, 2,2,4,4-tetramethylpentane, 2,2,4-trimethylhexane, 2,2,5-trimethylhexane, 2,2-dimethyl-3-heptene, 2,3-dimethyl-3-heptene, 2,4-dimethyl-1-heptene, 2,6-dimethyl-1-heptene, 2,6-dimethyl-3-heptene, 3,5-dimethyl-3-heptene, 2,4,4-trimethyl-1-hexene, 3,5,5-trimethyl-1-hexene, 1-ethyl-2-methylcyclohexane, 1-ethyl-3-methylcyclohexane, 1-ethyl-4-methylcyclohexane, propylcyclohexane, isopropylcyclohexane, 1,1,3-trimethylcyclohexane, 1,1,4-trimethylcyclohexane, 1,2,3-trimethylcyclohexane, 1,2,4-trimethylcyclohexane, 1,3,5-trimethylcyclohexane, allylcyclohexane, hydrindane, 1,8-nonadiene, 1-nonyne, 2-nonyne, 3-nonyne, 4-nonyne, 1-nonene, 2-nonene, 3-nonene, 4-nonene, n-decane, 3,3- dimethyloctane, 3,5-dimethyloctane, 4,4-dimethyloctane, 3-ethyl-3-methylheptane, 2-methylnonane, 3-methylnonane, 4-methylnonane, tert-butylcyclohexane, butylcyclohexane, isobutylcyclohexane, 4-isopropyl-1-methylcyclohexane, pentylcyclopentane, 1,1,3,5-tetramethylcyclohexane, cyclododecane, 1-decene, 2-decene, 3-decene, 4-decene, 5-decene, 1,9-decadiene, decahydronaphthalene, 1-decyne, 2-decyne, 3-decyne, 4-decyne, 5-decyne, 1,5,9-decatriene, 2,6-dimethyl-2,4,6-octatriene, limonene, myrcene, 1,2,3,4,5-pentamethylcyclopentadiene, α-phellandrene, pinene, terpinene, tetrahydrodicyclopentadiene, 5,6-dihydrodicyclopentadiene, dicyclopentadiene, 1,4-decadiyne, 1,5-decadiyne, 1,9-decadiyne, 2,8-decadiyne, 4,6-decadiyne, n-undecane, amylcyclohexane, 1-undecene, 1,10-undecadiene, 1-undecyne, 3-undecyne, 5-undecyne, tricyclo[6.2.1.0$^{2,7}$]undeca-4-ene, n-dodecane, 2-methylundecane, 3-methylundecane, 4-methylundecane, 5-methylundecane, 2,2,4,6,6-pentamethylheptane, 1,3-dimethyladamantane, 1-ethyladamantane, 1,5,9-cyclododecatriene, 1,2,4-trivinylcyclohexane, and isoparaffin; ketone solvents, such as cyclohexanone, cyclopentanone, acetone, methyl ethyl ketone, 2-octanone, 2-nonanone, 2-heptanone, 3-heptanone, 4-heptanone, 2-hexanone, 3-hexanone, diisobutyl ketone, methyl isobutyl ketone, methylcyclohexanone, and methyl n-pentyl ketone; ether solvents, such as ethylene glycol dimethyl ether, propylene glycol dimethyl ether, diethylene glycol dimethyl ether, diethylene glycol diethyl ether, diethylene glycol dibutyl ether, diethylene glycol ethyl methyl ether, diethylene glycol butyl methyl ether, diethyl ether, diisopropyl ether, di-n-butyl ether, di-sec-butyl ether, diisobutyl ether, amyl ether, isoamyl ether, di-tert-amyl ether, methyl cyclopentyl ether, methyl cyclohexyl ether, methyl-tert-butyl ether, di-n-hexyl ether, anisole, dihydroterpinyl acetate, tetrahydrofuran, and dioxane; ester solvents, such as ethylene glycol monomethyl ether acetate, ethylene glycol monoethyl ether acetate, ethylene glycol monobutyl ether acetate, ethylene glycol monopropyl ether acetate, ethylene glycol diacetate, propylene glycol monomethyl ether acetate, propylene glycol monoethyl ether acetate, propylene glycol monopropyl ether acetate, propylene glycol monobutyl ether acetate, propylene glycol mono-tert-butyl ether acetate, propylene glycol diacetate, diethylene glycol monomethyl ether acetate, diethylene glycol monoethyl ether acetate, diethylene glycol monopropyl ether acetate, diethylene glycol monobutyl ether acetate, methyl acetate, ethyl acetate, butyl acetate, isobutyl acetate, acetate-tert-butyl, ethyl pyruvate, methyl 3-methoxypropionate, ethyl 3-ethoxypropionate, tert-butyl propionate, 3-methoxybutyl acetate, and ethyl-3-ethoxypropionate; lactone solvents, such as γ-butyrolactone; nitrile solvents, such as acetonitrile; halogen-based solvents, such as methyl chloride, methylene chloride, chloroform, carbon tetrachloride, 1,2-dichloroethane, and 1,1,2,2-tetrachloroethane; polar nonprotic solvents, such as N-methylpyrrolidone, N,N'-dimethylformamide, N,N'-dimethylacetamide, dimethyl sulfoxide, and hexamethylphosphoramide; etc.

Note that the organic solvent is added in an amount within preferably 20 parts by mass or more and 500 parts by mass or less, more preferably 25 parts by mass or more and 100 parts by mass or less, relative to 100 parts by mass of the total amount of the polyurethane constituent components (polyisocyanate, high-molecular-weight polyol, chain extender, crosslinking agent).

The organic solvent may be removed by distillation under reduced pressure or by crystallization after the polymerization reaction, or may be applied into a conductive paste composition in a form of polyurethane solution without removal.

[Catalyst]

In the polyurethane synthesis, a catalyst is preferably added to promote the urethane bond formation reaction, as necessary.

The catalyst for urethane formation can be appropriately selected from known catalysts and used. Examples thereof include amine-based catalysts, ammonium salt-based catalysts, potassium salt-based catalysts, organometallic catalysts, etc.

Examples of the amine-based catalysts include triethylamine, N,N-dimethylcyclohexylamine, triethylenediamine, 2-methyltriethylenediamine, N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylhexamethylenediamine, bis(2-dimethylaminoethyl) ether, dimethylethanolamine, dimethylisopropanolamine, dimethylaminoethoxyethanol, N,N-dimethylhexanolamine, N,N-dimethyl-N'-(2-hydroxyethyl)ethylenediamine, N,N-dimethyl-N'-(2-hydroxyethyl) propanediamine, N,N,N'-trimethylaminoethylethanolamine, bis(dimethylaminopropyl)amine, bis(dimethylaminopropyl) isopropanolamine, N-methyl-N'-(2-dimethylaminoethyl) piperazine, N-methyl-N'-(2-hydroxyethyl)piperazine, N-methylmorpholine, N-ethylmorpholine, 1-methylimidazole, 1,2-dimethylimidazole, 1-isobutyl-2-methylimidazole, 1-dimethylaminopropylimidazole, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, etc.

Examples of the ammonium salt-based catalysts include quaternary ammonium salts, such as tetraethyl hydroxyl ammonium; ammonium salts of 1,8-diazabicyclo(5,4,0)-undecene-7 or 1,5-diazabicyclo(4,3,0)-nonene-5 with octylic acid, oleic acid, p-toluenesulfonic acid, formic acid, phenolic acid, ortho-phthalic acid, acetic acid, maleic acid, or boric acid; etc.

Examples of the potassium salt-based catalysts include potassium carbonate, potassium acetate, potassium octylate, etc.

Examples of the organometallic catalysts include: organotin compounds, such as tin acetate, tin octylate (tin 2-ethylhexaonate), tin oleate, tin laurate, dibutyltin diacetate, dimethyltin dilaurate, dibutyltin dilaurate, dibutyltin dimercaptide, dibutyltin maleate, dibutyltin dineodecanoate, dioctyltin dimercaptide, dioctyltin dilaurate, dibutyltin dichloride; organolead compounds, such as lead octoate and lead naphthenate; organonickel compounds, such as nickel naphthenate; organocobalt compounds, for example, cobalt naphthenate etc.; organocopper compounds, such as copper octenoate; organobismuth compounds, such as bismuth octylate and bismuth neodecanoate; etc.

Since the inventive polyurethane containing a weakly acidic functional group might inhibit the activity of a basic catalyst, it is preferable to use an organometallic catalyst, and more preferable example thereof is an organobismuth compound.

One of these catalysts for urethane formation may be used, or two or more thereof may be used in combination. Note that the catalyst for urethane formation is used in an amount within preferably 0 parts by mass or more and 5 parts by mass or less, more preferably 0.1 parts by mass or more and 2 parts by mass or less, relative to 100 parts by mass of the total amount of the polyurethane constituent components.

[Capping Agent]

To the polyurethane according to the present embodiments after the polymerization with excess isocyanate groups, a terminal capping agent may be added to introduce a functional group of the capping agent to the polyurethane terminal.

For example, as the capping agent for polyurethane terminal, the following hydroxy(meth)acrylates can be used to synthesize urethane acrylate.

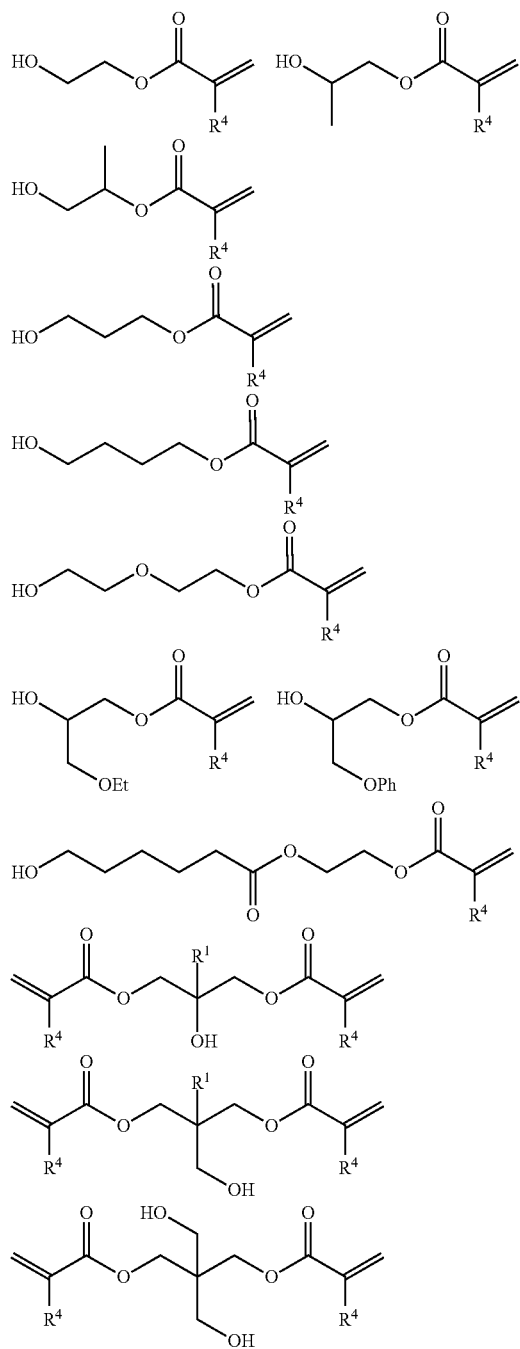

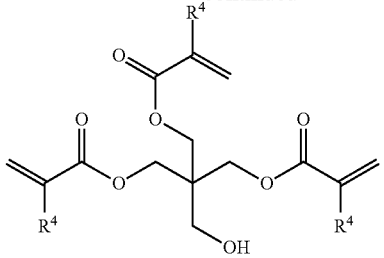

In the formulae, $R^4$ represents a hydrogen atom or a methyl group, Et represents an ethyl group, and Ph represents a phenyl group. $R^1$ is as defined above.

The urethane acrylate, together with a reactive monomer and a polymerization initiator if necessary, can be polymerized and cured to form a cured product by heating or irradiation with active energy beam, such as ultraviolet ray, visible light, laser beam, electron beam, X-ray, γ-ray, plasma, or microwave.

Examples of the reactive monomer that can be employed include alkyl (meth)acrylates, such as methyl (meth)acrylate, ethyl (meth)acrylate, isopropyl (meth)acrylate, n-butyl (meth)acrylate, t-butyl (meth)acrylate, isobutyl (meth)acrylate, isoamyl (meth)acrylate, lauryl (meth)acrylate, dodecyl (meth)acrylate, stearyl acrylate, cyclohexyl (meth)acrylate, isobornyl (meth)acrylate, and adamantyl (meth)acrylate; aryloxyalkyl (meth)acrylate, such as phenoxymethyl (meth)acrylate and phenoxyethyl (meth)acrylate; (meth)acrylic aralkyl esters, such as benzyl (meth)acrylate and phenethyl (meth)acrylate; monofunctional (meth)acrylate compounds, such as phenyl (meth)acrylate, 2-hydroxyethyl (meth)acrylate, 2-hydroxypropyl (meth)acrylate, 3-hydroxypropyl (meth)acrylate, and 4-hydroxybutyl (meth)acrylate; tri (meth)acrylates, such as butanediol di(meth)acrylate, hexanediol di(meth)acrylate, octanediol di(meth)acrylate, nonanediol di(meth)acrylate, dodecanediol di(meth)acrylate, ethoxylated hexanediol di(meth)acrylate, propoxylated hexanediol di(meth)acrylate, diethylene glycol di(meth)acrylate, polyethylene glycol di(meth)acrylate, polypropylene glycol di(meth)acrylate, neopentyl glycol di(meth)acrylate, ethoxylated neopentyl glycol di(meth)acrylate, trimethylolpropane tri(meth)acrylate, ethoxylated trimethylolpropane tri(meth)acrylate, propoxylated trimethylolpropane tri(meth)acrylate, tris(2-hydroxyethyl)isocyanurate tri (meth)acrylate, and glycerin tri(meth)acrylate; polyfunctional (meth)acrylate compounds, such as pentaerythritol tri(meth)acrylate, dipentaerythritol tri(meth)acrylate, ditrimethylolpropane tri(meth)acrylate, pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate; and ethyleneoxy-modified products, propyleneoxy-modified products, and lactone-modified products thereof. One of these may be used, or two or more thereof may be used in combination.

Examples of the polymerization initiator include acetophenone, 2,2-diethoxyacetophenone, p-dimethylaminoacetophenone, benzophenone, 2-chlorobenzophenone, 4,4'-bisdiethylaminobenzophenone, benzoin ethyl ether, benzoin-n-propyl ether, benzoin isopropyl ether, benzoin isobutyl ether, benzoin-n-butyl ether, benzoin dimethyl ketal, thioxanthone, p-isopropyl-α-hydroxyisobutylphenone, 2,2-dimethoxy-2-phenylacetophenone, 1-hydroxycyclohexyl phenyl ketone, 2-methyl-1-[4-(methylthio)phenyl]-2-morpholinopropan-1-one, 2-hydroxy-2-methyl-1-phenylpropan-1-one, 2,4,6-trimethylbenzophenone, 4-methylbenzophenone, (2,4,6-trimethylbenzoyl)-diphenylphosphine oxide, bis(2,4,6-trimethylbenzoyl)-phenylphosphine oxide, 2,2-dimethoxy-1,2-diphenylethanone, etc. Preferably, 1-hydroxycyclohexyl phenyl ketone or bis(2,4,6-trimethylbenzoyl)phenylphosphine oxide is used. One of these may be used, or two or more thereof may be used in combination.

Moreover, when a capping agent containing a weakly acidic functional group is used, the weakly acidic functional group can be introduced to the polyurethane terminal, too. Examples of such a capping agent include the following compounds, each of which contains the weakly acidic functional group and a hydroxyl group or amino group that can react with isocyanate.

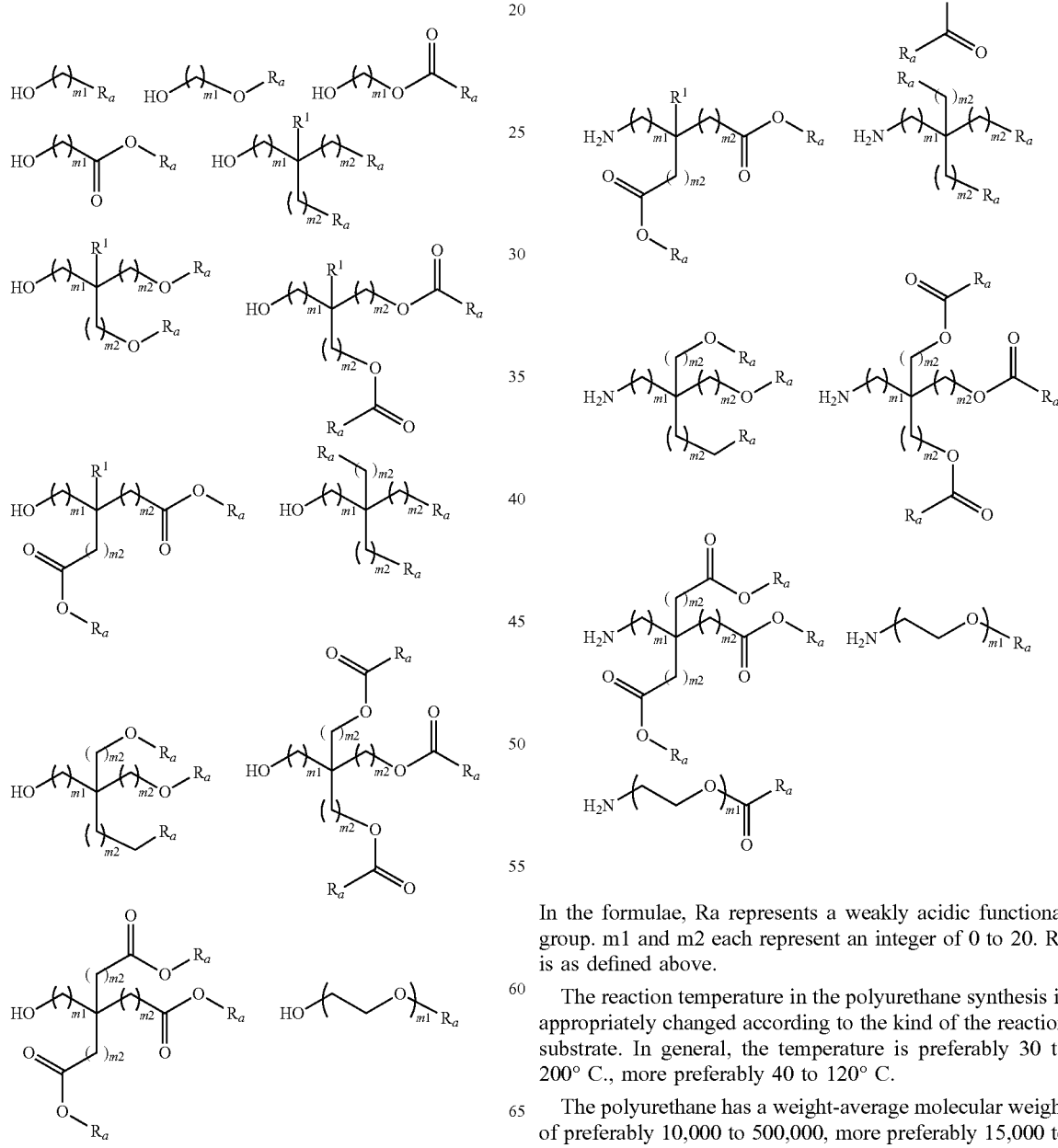

In the formulae, Ra represents a weakly acidic functional group. m1 and m2 each represent an integer of 0 to 20. $R^1$ is as defined above.

The reaction temperature in the polyurethane synthesis is appropriately changed according to the kind of the reaction substrate. In general, the temperature is preferably 30 to 200° C., more preferably 40 to 120° C.

The polyurethane has a weight-average molecular weight of preferably 10,000 to 500,000, more preferably 15,000 to 200,000, further preferably 20,000 to 150,000.

In the present embodiments, the polyurethane may further contain, as an additive(s), an antioxidant, defoamer, ultraviolet absorber, etc., if necessary.

<Conductive Paste Composition>

A conductive paste composition according to the present invention contains (A) a conductive filler, (B) a polyurethane containing a weakly acidic functional group having a pKa of 5 to 11, and (C) a solvent. Hereinafter, each component will be described in more details.

[(A) Conductive Filler]

The component (A) is for enhancing electrical conductivity, and examples thereof include metal particles or alloy particles, such as powders of gold, silver, platinum, copper, tin, iron, titanium, nickel, palladium, aluminum, tungsten, molybdenum, ruthenium, chromium, indium, or solder, and silver-plated powders thereof; powders of carbon black, carbon nanotube, silver chloride, zinc oxide, titanium oxide, indium tin oxide, or the like; etc.

From the viewpoint of conductivity, gold, silver, or platinum is preferable. From the viewpoint of price, silver, copper, tin, iron, titanium, nickel, aluminum, tungsten, molybdenum, ruthenium, chromium, or stainless steel is preferable. Comprehensively, silver (silver powder) is most preferable.

The conductive filler particles may have any shape, such as spherical, granular, angular, dendritic, flaky, needle-like, or irregular shape. Several types of such fillers may be used in combination.

The average particle diameter of the conductive filler is not particularly limited, but is preferably 5 nm to 10 μm.

The method for measuring the average particle diameter is not particularly limited. For example, a laser diffraction-type particle size distribution measurement apparatus can be used for the measurement.

The conductive filler is added in an amount within a range preferably exceeding 70 parts by mass, more preferably 80 parts by mass or more and 90 parts by mass or less, relative to 100 parts by mass of a total of the conductive filler (A) and the polyurethane (B).

[(B) Polyurethane Containing Weakly Acidic Functional Group Having pKa of 5 to 11]

Examples of the polyurethane containing a weakly acidic functional group with a pKa of 5 to 11 include those described above.

One kind of the polyurethane containing a weakly acidic functional group may be used, or several types thereof may be used in mixture. Further, part of the polyurethane containing a weakly acidic functional group may be substituted with a polyurethane containing no weakly acidic functional group.

The polyurethane containing no weakly acidic functional group is contained in an amount of preferably 0 to 50 mass % relative to a total amount of the polyurethane containing a weakly acidic functional group and the polyurethane containing no weakly acidic functional group.

In the case where the conductive filler is metal or alloy particles, particularly silver powder, the inventive conductive paste composition presumably has a silver salt formed from oxide film of the silver powder and the weakly acidic functional group in the polyurethane, and the silver salt is subjected to reduction reaction by heating, so that silver nanoparticles are formed. In this event, if the functional group exhibits a strong acidity with a pKa of less than 5, stable silver salt is formed, and the reduction by heating hardly progresses. If the acidity is so weak that the pKa exceeds 11, the silver salt and then silver nanoparticles are hardly formed. Considering these, a polyurethane to be used contains a functional group that exhibits an acidity within a predetermined range. This conceivably enables silver salt formation and silver salt reduction even by baking at relatively low temperature, and silver nanoparticles are likely formed.

[(C) Solvent]

The component (C) is a solvent. Incorporating the component (C) makes the conductive paste composition have suitable viscosity, and enhances the workability.

Specific examples of the solvent as the component (C) include: aromatic hydrocarbon solvents, such as toluene, xylene, cumene, 1,2,3-trimethylbenzene, 1,2,4-trimethylbenzene, 1,3,5-trimethylbenzene, styrene, α-methylstyrene, butylbenzene, sec-butylbenzene, isobutylbenzene, cymene, diethylbenzene, 2-ethyl-p-xylene, 2-propyltoluene, 3-propyltoluene, 4-propyltoluene, 1,2,3,5-tetramethyltoluene, 1,2,4,5-tetramethyltoluene, tetrahydronaphthalene, 4-phenyl-1-butene, tert-amylbenzene, amylbenzene, 2-tert-butyltoluene, 3-tert-butyltoluene, 4-tert-butyltoluene, 5-isopropyl-m-xylene, 3-methylethylbenzene, tert-butyl-3-ethylbenzene, 4-tert-butyl-o-xylene, 5-tert-butyl-m-xylene, tert-butyl-p-xylene, 1,2-diisopropylbenzene, 1,3-diisopropylbenzene, 1,4-diisopropylbenzene, dipropylbenzene, pentamethylbenzene, hexamethylbenzene, hexylbenzene, and 1,3,5-triethylbenzene; aliphatic hydrocarbon solvents, such as n-heptane, isoheptane, 3-methylhexane, 2,3-dimethylpentane, 3-ethylpentane, 1,6-heptadiene, 5-methyl-1-hexyne, norbornane, norbornene, dicyclopentadiene, 1-methyl-1,4-cyclohexadiene, 1-heptyne, 2-heptyne, cycloheptane, cycloheptene, 1,3-dimethylcyclopentane, ethylcyclopentane, methylcyclohexane, 1-methyl-1-cyclohexene, 3-methyl-1-cyclohexene, methylenecyclohexane, 4-methyl-1-cyclohexene, 2-methyl-1-hexene, 2-methyl-2-hexene, 1-heptene, 2-heptene, 3-heptene, n-octane, 2,2-dimethylhexane, 2,3-dimethylhexane, 2,4-dimethylhexane, 2,5-dimethylhexane, 3,3-dimethylhexane, 3,4-dimethylhexane, 3-ethyl-2-methylpentane, 3-ethyl-3-methylpentane, 2-methylheptane, 3-methylheptane, 4-methylheptane, 2,2,3-trimethylpentane, 2,2,4-trimethylpentane, cyclooctane, cyclooctene, 1,2-dimethylcyclohexane, 1,3-dimethylcyclohexane, 1,4-dimethylcyclohexane, ethylcyclohexane, vinylcyclohexane, isopropylcyclopentane, 2,2-dimethyl-3-hexene, 2,4-dimethyl-1-hexene, 2,5-dimethyl-1-hexene, 2,5-dimethyl-2-hexene, 3,3-dimethyl-1-hexene, 3,4-dimethyl-1-hexene, 4,4-dimethyl-1-hexene, 2-ethyl-1-hexene, 2-methyl-1-heptene, 1-octene, 2-octene, 3-octene, 4-octene, 1,7-octadiene, 1-octyne, 2-octyne, 3-octyne, 4-octyne, n-nonane, 2,3-dimethylheptane, 2,4-dimethylheptane, 2,5-dimethylheptane, 3,3-dimethylheptane, 3,4-dimethylheptane, 3,5-dimethylheptane, 4-ethylheptane, 2-methyloctane, 3-methyloctane, 4-methyloctane, 2,2,4,4-tetramethylpentane, 2,2,4-trimethylhexane, 2,2,5-trimethylhexane, 2,2-dimethyl-3-heptene, 2,3-dimethyl-3-heptene, 2,4-dimethyl-1-heptene, 2,6-dimethyl-1-heptene, 2,6-dimethyl-3-heptene, 3,5-dimethyl-3-heptene, 2,4,4-trimethyl-1-hexene, 3,5,5-trimethyl-1-hexene, 1-ethyl-2-methylcyclohexane, 1-ethyl-3-methylcyclohexane, 1-ethyl-4-methylcyclohexane, propylcyclohexane, isopropylcyclohexane, 1,1,3-trimethylcyclohexane, 1,1,4-trimethylcyclohexane, 1,2,3-trimethylcyclohexane, 1,2,4-trimethylcyclohexane, 1,3,5-trimethylcyclohexane, allylcyclohexane, hydrindane, 1,8-nonadiene, 1-nonyne, 2-nonyne, 3-nonyne, 4-nonyne, 1-nonene, 2-nonene, 3-nonene, 4-nonene, n-decane, 3,3-dimethyloctane, 3,5-dimethyloctane, 4,4-dimethyloctane, 3-ethyl-3-methylheptane, 2-methylnonane, 3-methylnonane, 4-methylnonane, tert-butylcyclohexane, butylcyclohexane, isobutylcyclohexane, 4-isopropyl-1-methylcyclohexane, pentylcyclopentane, 1,1,3,5-tetramethylcyclohexane, cyclododecane, 1-decene, 2-decene, 3-decene, 4-decene, 5-decene, 1,9-decadiene, decahydronaphthalene, 1-decyne, 2-decyne, 3-decyne, 4-decyne, 5-decyne, 1,5,9-decatriene, 2,6-dimethyl-2,4,6-octatriene, limonene, myrcene, 1,2,3,4,5-pentamethylcyclopentadiene, α-phellandrene, pinene, terpinene, tetrahydrodicyclopentadiene, 5,6-dihydrodicyclopentadiene, dicyclopentadiene, 1,4-decadiyne, 1,5-decadiyne, 1,9-decadiyne, 2,8-decadiyne, 4,6-decadiyne, n-undecane, amylcyclohexane, 1-undecene, 1,10-undecadiene, 1-undecyne, 3-undecyne, 5-undecyne, tricyclo[6.2.1.0$^{2,7}$]undeca-4-ene, n-dodecane, 2-methylundecane, 3-methylundecane, 4-methylundecane, 5-methylundecane, 2,2,4,6,6-pentamethylheptane, 1,3-dimethyladamantane, 1-ethyladamantane, 1,5,9-cyclododecatriene, 1,2,4-trivinylcyclohexane, and isoparaffin; ketone solvents, such as cyclohexanone, cyclopentanone, 2-octanone, 2-nonanone, 2-heptanone, 3-heptanone, 4-heptanone, 2-hexanone, 3-hexanone, diisobutyl ketone, methylcyclohexanone, methyl n-pentyl ketone, methyl isobutyl ketone, and isophorone; alcohol solvents, such as 3-methoxybutanol, 3-methyl-3-methoxybutanol, 1-methoxy-2-propanol, and 1-ethoxy-2-propanol; ether solvents, such as propylene glycol monomethyl ether, ethylene glycol monomethyl ether, propylene glycol monoethyl ether, ethylene glycol monoethyl ether, propylene glycol dimethyl ether, diethylene glycol dimethyl ether, diethylene glycol diethyl ether, diethylene glycol monomethyl ether, diethylene glycol monoethyl ether, diethylene glycol monopropyl ether, diethylene glycol monobutyl ether, diisopropyl ether, diisobutyl ether, diisopentyl ether, di-n-pentyl ether, methyl cyclopentyl ether, methyl cyclohexyl ether, di-n-butyl ether, di-sec-butyl ether, di-sec-pentyl ether, di-tert-amyl ether, di-n-hexyl ether, and anisole; ester solvents, such as ethylene glycol monobutyl ether acetate, propylene glycol monomethyl ether acetate, propylene glycol monoethyl ether acetate, propylene glycol monopropyl ether acetate, propylene glycol monobutyl ether acetate, propylene glycol diacetate, diethylene glycol monomethyl ether acetate, diethylene glycol monoethyl ether acetate, diethylene glycol monobutyl ether acetate, ethyl lactate, ethyl pyruvate, butyl acetate, methyl 3-methoxypropionate, ethyl 3-ethoxypropionate, tert-butyl acetate, tert-butyl propionate, and propylene glycol mono-tert-butyl ether acetate; lactone solvents, such as γ-butyrolactone; terpene solvents, such as α-terpineol, α-pinene, dihydroterpineol, and dihydroterpinyl acetate; etc. One of the solvents may be used, or two or more thereof may be used in mixture.

Diethylene glycol monobutyl ether, diethylene glycol monoethyl ether acetate, or diethylene glycol monobutyl ether acetate is particularly preferable because the solvents hardly evaporate during printing and impart suitable viscosity for printing.

The solvent (organic solvent) is preferably added in an amount within 100 to 1,000 parts by mass relative to 100 parts by mass of the polyurethane (B).

<Conductive Wire>

Moreover, the present invention provides a conductive wire made from a baked product of the conductive paste composition formed on a substrate. A stretchable conductive wire is provided when the substrate has stretchability.

Hereinafter, the inventive conductive wire will be described, but the present invention is not limited to the following.

Examples of the substrate on which the conductive wire is formed include polyurethane, polyester, silicone, nitrile rubber, butadiene rubber, polyethylene, polypropylene, polyolefin, PTFE, PFA, etc. The substrate is preferably stretchable, and is more preferably a stretchable sheet or film, further preferably a stretchable polyurethane substrate, particularly preferably a thermoplastic polyurethane substrate. The surface of the sheet may be flat or uneven. Uneven surface allows formation of a stretchable wire having a bellows-like structure in a direction orthogonal to the substrate, and makes it possible to suppress change in the conductivity at the time of elongation and shrinkage. Alternatively, it is also possible to use a nonwoven fabric or a fabric made of stretchable fibers.

The stretchable substrate preferably has a stretchability of 1000% at maximum. Human skins are known to stretch, according to the movements, by 10% on bones of chest and so forth, by 20% on abdominal portions and so forth, and by 50% on joints. The stretchability required for conductive wires vary depending on the attachment location on skin.

Hereinbelow, description will be given of the case where a substrate having stretchability (stretchable substrate) is employed. Basically, the same will hold true for substrates not having stretchability, and the present invention is not limited to the following.

A conductive wire made from the inventive conductive paste composition is formed on a stretchable substrate. The method for applying such conductive wire onto a stretchable substrate is not particularly limited. Examples of suitable methods include dip coating, spray coating, spin coating, roll coating, flow coating, doctor coating, screen printing, flexographic printing, gravure printing, inkjet printing, etc. Particularly, forming a wire pattern by printing can enhance the productivity and enables non-restrictive design, including wiring width.

The conductive wire to be used preferably has a thickness in a range of 10 nm to 1000 μm, more preferably 5 μm to 50 μm.

After the stretchable substrate is coated by printing, the conductive paste composition is baked. The baking temperature can be in a range of 60 to 160° C., preferably 120° C. to 150° C., for a period of 1 second to 10 hours, preferably 10 minutes to 5 hours. The baking can be performed on a hot plate or in an oven, or may be performed by flash annealing in a shorter period at higher temperature than the above temperatures. It is also possible to perform the baking by irradiation with infrared light.

The electric conductivity of the stretchable conductive wire can be evaluated by measuring the electric resistance between both ends of the wire formed on the substrate. The stretchable conductive wire can be evaluated as excellent when the change in electric resistance is small between before and after the elongation of the substrate, and when the degradation of the electric conductivity is small after the elongated substrate is shrunk and returned to the original shape. It is more preferable that when elongations and shrinkages are repeated, no wire breakage occurs and the change in electric resistance is small.

In addition, when elongated by 20%, the inventive conductive wire preferably has an electric resistance which is 500% or less of an electric resistance before the elongation. When elongated and shrunk repeatedly 1000 times with an elongation ratio of 20%, the inventive conductive wire preferably has a maximum electric resistance which is 5000% or less of an electric resistance before the elongations and the shrinkages. These electric resistances can be obtained according to a measurement method to be described later.

Further, a cover film may be formed to cover the conductive wire. Forming a cover film can improve the water resistance and mechanical strength. The cover film also needs to be stretchable when both of the substrate and the conductive wire are stretchable. Like the substrate, the material of the cover film can be selected from polyurethane, urethane acrylate, polyester, silicone, nitrile rubber, butadiene rubber, polyethylene, polypropylene, polyolefin, PTFE, PFA, etc. The cover film to be used preferably has a thickness in a range of 10 nm to 1 mm.

In the conductive wire formed using the inventive conductive paste composition, particularly containing a silver powder, silver nanoparticles formed in the wire baking process disperse among the silver powder in the insulating polymer, so that high conductivity is exhibited. Furthermore, even when the distances among the silver powder particles are increased as a result of the wire elongation, the electricity conduction path is rarely interrupted because of the silver nanoparticles dispersed among the silver powder. For the same reason, the wire rarely breaks, and the conductivity varies slightly.

EXAMPLE

Hereinafter, the present invention will be specifically described with reference to Synthesis Examples, Examples, and Comparative Examples. However, the present invention is not limited thereto. Note that weight-average molecular weight (Mw) and number-average molecular weight (Mn) were measured in terms of polystyrene by gel permeation chromatography (GPC). The GPC measurement conditions were as follows.

Column: TSKgel G4000$H_{XL}$, TSKgel G3000$H_{XL}$, TSKgel G2000$H_{XL}$ (two)
Mobile phase: tetrahydrofuran
Column oven temperature: 40° C.
Sample concentration: 0.20 mass %
Sample injection amount: 100 μL
Flow rate: 1 mL/min Thermoplastic polyurethanes having a fluorine-containing functional group on a side chain were synthesized as follows.

[1] Synthesis of Polyol Containing Weakly Acidic Functional Group

Synthesis Example 1-1

Synthesis of Hexafluoroalcohol-Containing Chain Extender (6)

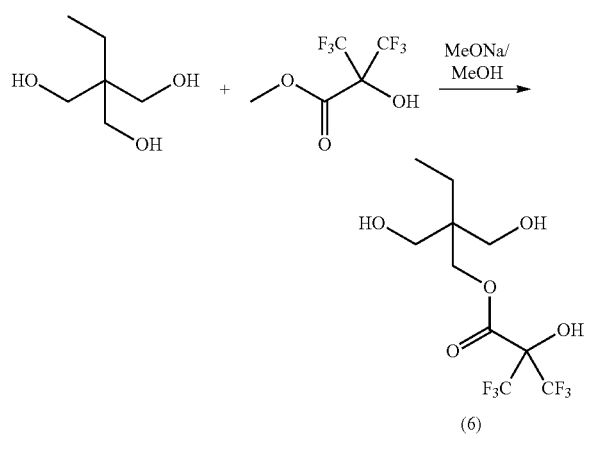

A 3-L four-necked flask was charged with 1260 g of trimethylolpropane, 1415 g of Fluoroalcohol (6a), and 60.7 g of a 28 mass % solution of sodium methoxide in methanol, and these were stirred under a nitrogen atmosphere at 100 to 140° C. The mixture was subjected to transesterification while methanol was being distilled off. After the reaction was completed, the resultant was cooled to 50° C. or less and diluted with isopropyl ether (IPE). After neutralization with 20 mass % hydrochloric acid and dilution with water, the resultant was transferred to a separation funnel for extraction with IPE. Then, the organic layer was sequentially washed with water and saturated saline, and dried with sodium sulfate. The solvent was distilled off under reduced pressure. The resulting crude product was dissolved in 800 g of IPE, and added dropwise to 1200 g of hexane. The deposited particles were separated by filtration, and then washed with 800 g of 10 mass % IPE/hexane mixed solvent. The resulting white powder was dried under vacuum at 50° C. for 4 hours. Thus, 949 g of Chain extender (6) was obtained (purity: 99.1%, yield: 46.2%).

Chain extender (6):
white powder
$^1$H-NMR (DMSO-d6): δ=0.78 (3H, t), 1.26 (2H, q), 3.27 (4H, m), 4.17 (2H, s), 4.49 (2H, t), 9.08 (1H, s)

Synthesis Example 1-2

Synthesis of Hexafluoroalcohol-Containing Chain Extender (7)

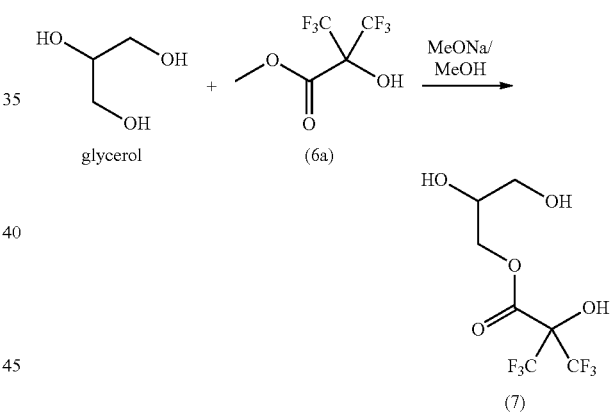

Chain extender (7) was obtained (yield: 40%) by the same method as in [Synthesis Example 1-1], except that the raw-material trimethylolpropane was changed to glycerol.

Synthesis Example 1-3

Synthesis of Hexafluoroalcohol-Containing Chain Extender (8)

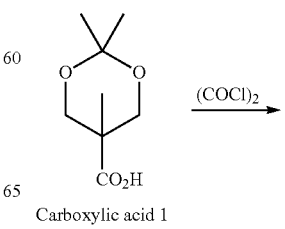

Carboxylic acid 1

Synthesis Example 1-3-1

Synthesis of Alcohol-Protecting Compound (8b)

Under a nitrogen atmosphere, 8.7 g of oxalyl chloride was added into a suspension composed of 10.0 g of Carboxylic acid 1, 50.0 g of toluene, and two drops of N,N-dimethylformamide. After the mixture was stirred at room temperature for 5 hours, the solvent was distilled off under reduced pressure. Thereby, Acid chloride 1 was obtained.

Under a nitrogen atmosphere, a solution of Acid chloride 1 in acetonitrile was added to an ice-cooled solution containing 15.6 g of Alcohol (8a), 7.9 g of triethylamine, and 20 mL of acetonitrile, and stirred at room temperature overnight. After the reaction was completed, water was added, and the organic layer obtained by extraction with ethyl acetate was washed with water, and dried with sodium sulfate. The solvent was distilled off. Thus, 19.0 g of (8b) was obtained (crude yield: 80%).

Synthesis Example 1-3-2

Then, 15.0 g of Alcohol-protecting compound (8b) obtained above, 30 g of methanol, and 1 g of strongly-acidic cation exchange resin were heated under reflux. While acetone was being distilled off, the deprotection was performed. After the reaction was completed, the ion exchange resin was removed, and the solvent was distilled off. Thus, 13.3 g of Chain extender (8) was obtained (crude yield: 97%).

Synthesis Example 1-4

Synthesis of Hexafluoroalcohol-Containing Chain Extender (9)

Chain extender (9) was obtained (yield of two steps: 75%) by the same method as in [Synthesis Example 1-3], except that Alcohol (8a) was changed to Alcohol (9a).

Synthesis Example 1-5

Synthesis of Pentafluoroalcohol-Containing Chain Extender (10)

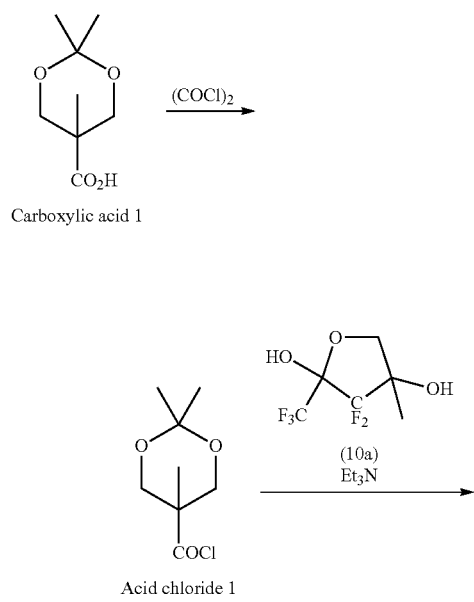

Synthesis Example 1-6

Synthesis of trifluoromethanesulfonamide-containing Chain extender (11)

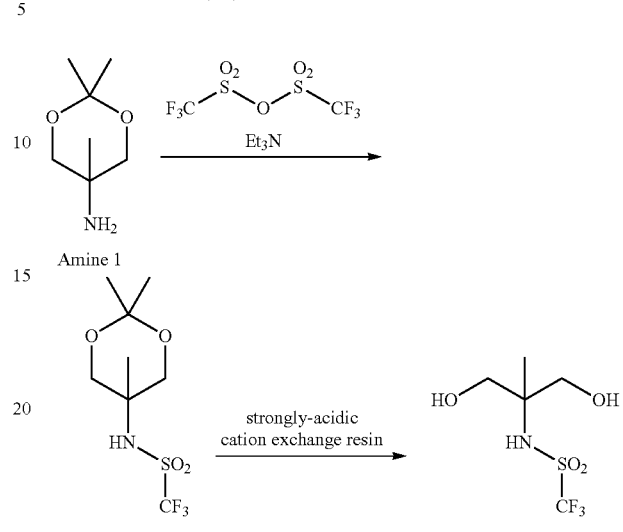

Synthesis Example 1-6-1

Synthesis of Alcohol-Protecting Compound (11a)

Under a nitrogen atmosphere, 32.1 g of trifluoromethanesulfonic anhydride was added dropwise at −78° C. to a mixed solution containing 15.0 g of Amine 1, 45.0 g of dichloromethane, and 12.5 g of triethylamine, and stirred at this temperature for 2 hours. The temperature was increased to room temperature, and the mixture was further stirred for 1 hour. Then, water was added while the mixture was being cooled with ice to stop the reaction. The organic layer obtained by extraction with ethyl acetate was washed with water, and dried with sodium sulfate. The solvent was distilled off. Thus, 22.7 g of (11a) was obtained (crude yield: 78%).

Synthesis Example 1-6-2

Synthesis of Chain Extender (11)

Chain extender (11) was obtained (yield: 87%) by the same method as in [Synthesis Example 1-3-2], except that Alcohol-protecting compound (8b) was changed to Alcohol-protecting compound (11a).

Synthesis Example 1-7

Synthesis of Hexafluoroalcohol-Containing Chain Extender (12)

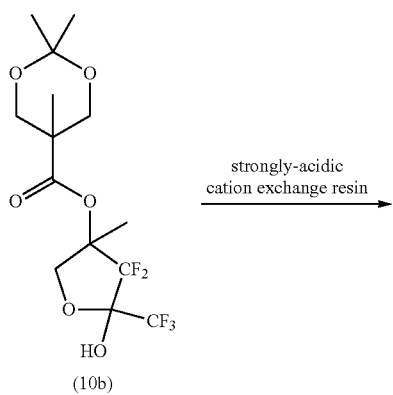

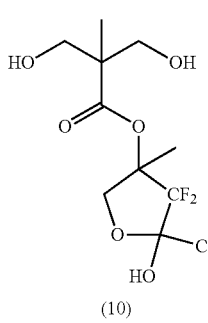

Chain extender (10) was obtained (yield of two steps: 75%) by the same method as in [Synthesis Example 1-3], except that Alcohol (8a) was changed to Alcohol (10a).

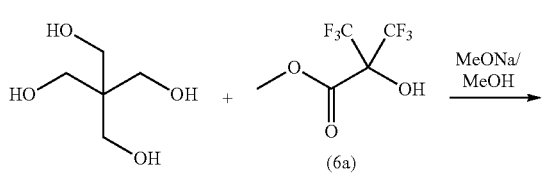

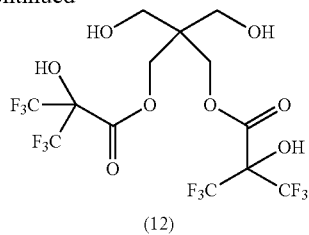

Chain extender (12) was obtained (yield: 36%) by the same method as in [Synthesis Example 1-1], except that the raw-material trimethylolpropane was changed to pentaerythritol.

Synthesis Example 1-8

Synthesis of Chain Extender (13)

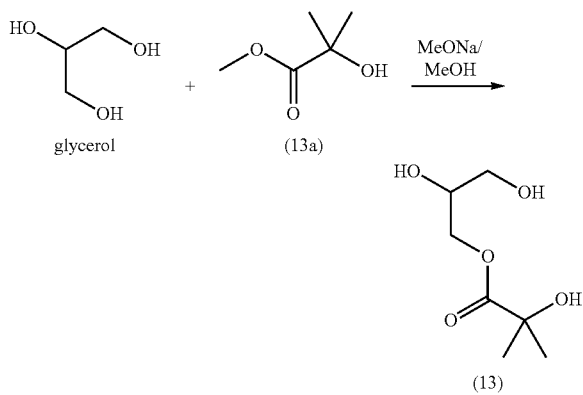

Chain extender (13) was obtained (yield: 37%) by the same method as in [Synthesis Example 1-2], except that Fluoroalcohol (6a) was changed to Alcohol (13a).

Synthesis Example 1-9

Synthesis of Chain Extender (14)

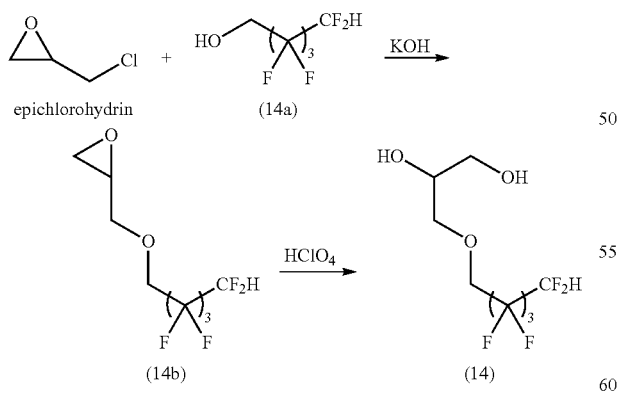

Synthesis Example 1-9-1

Synthesis of Intermediate (14b)
Under a nitrogen atmosphere, 116.2 g of Alcohol (14a) was added dropwise at 0 to 10° C. to a suspension composed of 33.7 g of potassium hydroxide and 250 mL of acetonitrile. After the mixture was stirred at room temperature for 6 hours, 46.5 g of epichlorohydrin was added dropwise thereto, and stirred at 50° C. for 17 hours. Water was added to the reaction solution to stop the reaction. Then, the organic layer was extracted, washed with water, and dried with sodium sulfate. The solvent was distilled off under reduced pressure. By distillation under reduced pressure, 105 g of Intermediate (14b) was obtained (yield: 77%).

Synthesis Example 1-9-2

Synthesis of Chain Extender (14)
Under a nitrogen atmosphere, 92 g of Intermediate (14b), 127 g of water, tetrahydrofuran, and 11.0 g of perchloric acid were mixed and stirred at room temperature for 24 hours, and further stirred at 40° C. for 2 hours. Saturated sodium bicarbonate in water was added to the reaction solution to stop the reaction. Then, the organic layer extracted with ethyl acetate was washed with water, and dried with sodium sulfate. The solvent was distilled off. By distillation under reduced pressure, 49.9 g of Chain extender (14) was obtained (yield: 51%).

[2] Synthesis of Polyurethane Containing Weakly Acidic Functional Group
Raw Materials
<High-Molecular-Weight Polyols>
  NIPPOLAN 4010 (manufactured by Tosoh Corporation): polyester polyol, number-average molecular weight: 2000
  NIPPOLAN 4009 (manufactured by Tosoh Corporation): polyester polyol, number-average molecular weight: 1000
  KURARAY POLYOL P-2010 (manufactured by KURARAY CO., LTD.): polyester polyol, number-average molecular weight: 2000
  KURARAY POLYOL C-2090 (manufactured by KURARAY CO., LTD.): polycarbonate polyol, number-average molecular weight: 2000
  PLACCEL 210 (manufactured by DAICEL CORPORATION): polycaprolactone diol, number-average molecular weight: 1000
<Diisocyanates>
  tolylene diisocyanate (TDI)
  isophorone diisocyanate (IPDI)
<Chain Extenders>

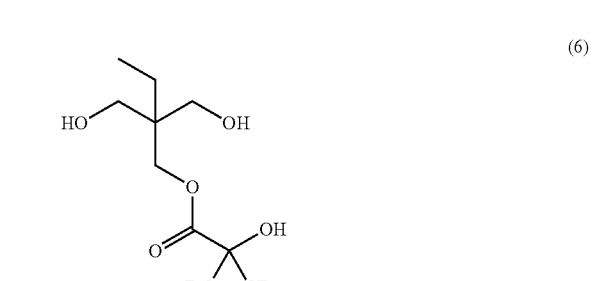

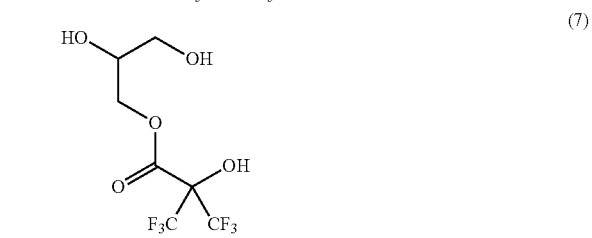

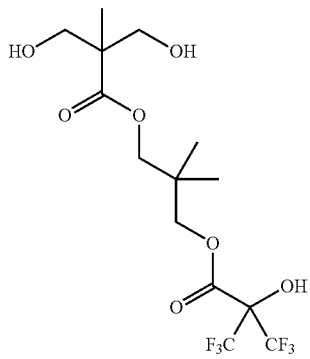
(8)

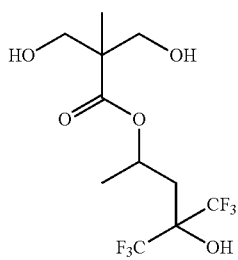
(9)

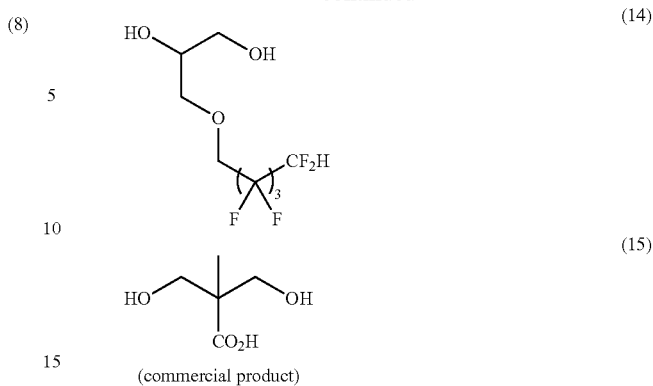
(14)

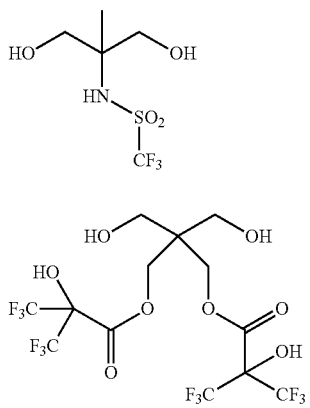
(10)

(11)

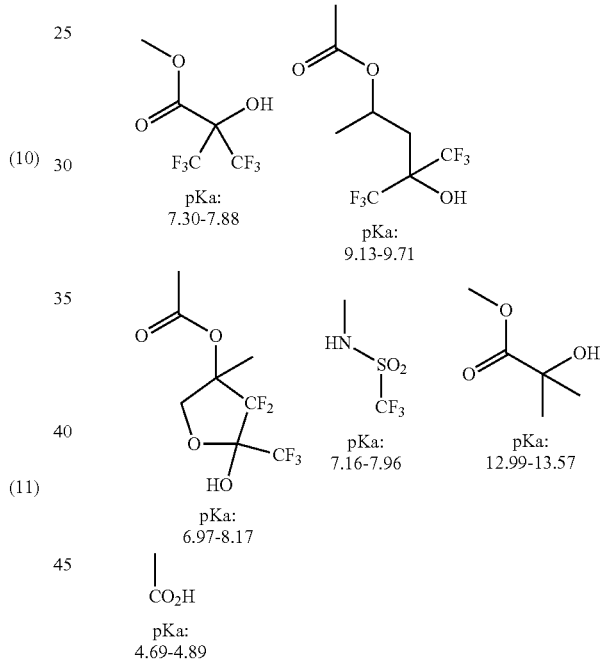
(15)

(commercial product)

The calculated pKa values of the partial structures in the above chain extenders were as follows. Note that the pKa values were calculated using pKa calculator in ChemSketch (Advanced Chemistry Development, Inc.).

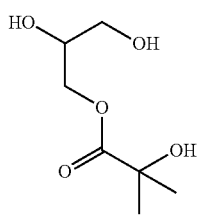
(12)

(13)

<Catalyst>
XK-640 (manufactured by KING INDUSTRIES, Inc.)

Synthesis Example 2

Under a nitrogen stream, 47.7 g of TDI and 0.05 g of XK-640 (manufactured by KING INDUSTRIES, Inc.) were introduced into a reaction container of a planetary mixer and heated to 60° C. Then, 114.9 g of a 80 mass % solution of NIPPOLAN 4009 in diethylene glycol monobutyl ether acetate (BCA) was added thereto and stirred for 30 minutes. Thereby, a prepolymer was prepared. The prepolymer solution was diluted with 50.7 g of diethylene glycol monobutyl ether acetate (BCA), and subsequently heated to 90° C. To the resultant, 120.7 g of a 50 mass % solution of Chain extender (6) in diethylene glycol monobutyl ether acetate (BCA) was added dropwise. While the reaction temperature was kept at 90° C., the resultant was aged for 9 hours. Thus, a solution of PU1 in BCA was obtained.

PU1:

Mw=119,220, Mw/Mn=4.22

PU2 to PU11 and Comparative PU1 to Comparative PU3 were synthesized by the same procedure as in [Synthesis Example 2], except that the kinds and blend ratios of diisocyanate, high-molecular-weight polyol, and chain extender, as well as the amount of catalyst used were changed as shown in Table 1.

cumulative value up to 50% of the particle diameters was determined as an average particle diameter.

According to the compositions shown in Tables 2, 3, the polymers, conductive fillers, and the solvent (diethylene glycol monobutyl ether acetate (BCA)) were stirred and mixed to prepare conductive paste compositions.

[Evaluation of Stretchable Conductive Wire]

<Preparation of Evaluation Samples>

A conductive paste composition was applied onto a polyurethane film by using a screen printer MT-320TVC manu-

TABLE 1

|  | High-molecular-weight polyol [parts by mass] | Diisocyanate [parts by mass] | Chain extender [parts by mass] | Catalyst [parts by mass] | Mw | Mw/Mn | pKa of functional group |
|---|---|---|---|---|---|---|---|
| PU1 | NIPPOLAN 4009 [46] | TDI [24] | (6) [30] | XK-640 [0.05] | 119,220 | 4.22 | 7.30-7.88 |
| PU2 | NIPPOLAN 4009 [43] | IPDI [30] | (7) [27] | XK-640 [2.00] | 63,690 | 4.93 | 7.30-7.88 |
| PU3 | NIPPOLAN 4009 [43] | TDI [22] | (8) [35] | XK-640 [0.05] | 87,650 | 4.15 | 7.30-7.88 |
| PU4 | NIPPOLAN 4009 [45] | TDI [23] | (9) [32] | XK-640 [0.05] | 45,320 | 4.54 | 9.13-9.71 |
| PU5 | NIPPOLAN 4009 [45] | TDI [24] | (10) [31] | XK-640 [0.05] | 79,680 | 4.11 | 6.97-8.17 |
| PU6 | NIPPOLAN 4009 [50] | TDI [26] | (11) [24] | XK-640 [0.05] | 35,660 | 4.89 | 7.16-7.96 |
| PU7 | NIPPOLAN 4009 [39] | TDI [20] | (12) [41] | XK-640 [0.05] | 58,980 | 5.12 | 7.30-7.88 |
| PU8 | NIPPOLAN 4010 [48] | IPDI [25] | (7) [27] | XK-640 [2.00] | 25,000 | 3.22 | 7.30-7.88 |
| PU9 | P-2010 [46] | IPDI [27] | (7) [27] | XK-640 [2.00] | 71,840 | 5.47 | 7.30-7.88 |
| PU10 | C-2090 [47] | IPDI [25] | (7) [28] | XK-640 [2.00] | 21,660 | 2.63 | 7.30-7.88 |
| PU11 | PLACCEL 210 [45] | IPDI [29] | (7) [26] | XK-640 [1.00] | 20,000 | 2.11 | 7.30-7.88 |
| Comparative PU1 | NIPPOLAN 4009 [50] | IPDI [32] | (13) [18] | XK-640 [0.05] | 30,800 | 5.46 | 12.99-13.57 |
| Comparative PU2 | NIPPOLAN 4010 [46] | IPDI [27] | (14) [27] | XK-640 [0.05] | 18,410 | 2.05 | — |
| Comparative PU3 | NIPPOLAN 4009 [53] | IPDI [33] | (15) [14] | XK-640 [0.05] | 30,890 | 2.42 | 4.69-4.89 |

Examples 1 to 11, Comparative Examples 1 to 5

<Preparation of Conductive Paste Compositions>

As polyurethanes for preparing conductive paste compositions, PU1 to PU11 and Comparative PU1 to Comparative PU3 shown in Table 1 as well as the following resins were prepared.

fluorine rubber (manufactured by DAIKIN INDUSTRIES, LTD., G801)

polyester (manufactured by UNITIKA LTD., UE-9200)

As conductive fillers, the following Silver powders A to E and Copper powder A were prepared.

Silver powder A: average particle diameter ($D_{L50}$): 2.1 μm

Silver powder B: average particle diameter ($D_{L50}$): 5.3 μm

Silver powder C: average particle diameter ($D_{L50}$): 1.2 μm

Silver powder D: average particle diameter ($D_{L50}$): 0.67 μm

Silver powder E: average particle diameter ($D_{L50}$): 1.72 μm

Copper powder A: average particle diameter ($D_{L50}$): 1.30 μm

In the average particle diameter measurement, a laser-diffraction particle-size-distribution measurement apparatus was used to measure the particle size distribution, and the factured by Micro-tec Co., Ltd., and then heated with a hot-air dryer to thus form a stretchable conductive wire with a width of 10 mm, a length of 70 mm, and a thickness of 10 μm.

<Measurement of Initial Electric Resistance in Non-Elongated State>

The electric resistance between two ends of the stretchable conductive wire formed on the polyurethane film was measured by 4-terminal resistance measurement method. The electric resistance was measured with PXIe-4136SMU resistance measurement unit manufactured by NATIONAL INSTRUMENTS CORP.

Electric resistance (Ω) $R=V/I$ ($V$: voltage, $I$: current)

Tables 2, 3 show the measurement result of the initial electric resistance (electric resistance in a non-elongated state).

<Measurement of Maximum Electric Resistance at 20% Elongation>

The polyurethane film with the stretchable conductive wire formed thereon was elongated by 20% from the non-elongated state (0%), where the polyurethane film was not loose, either. The polyurethane film in this 20%-elongation state was immobilized to measure the electric resistance by 4-terminal resistance measurement method.

The polyurethane film with the stretchable conductive wire formed thereon was elongated at a speed of 300 mm/min in a longitudinal direction of the stretchable conductive wire (rectangle) by using a precision universal testing machine AG-Xplus HS manufactured by SHIMADZU CORPORATION.

Change in electric resistance at 20% elongation=
[electric resistance (Ω) at 20% elongation]÷
[initial electric resistance (Ω)]×100

Tables 2, 3 show the change in electric resistance at 20% elongation.

<Measurement of Maximum Electric Resistance at 300% Elongation>

The polyurethane film with the stretchable conductive wire formed thereon, which was in the non-elongated state of 0%, was elongated by 300% and immobilized to measure the electric resistance.

The polyurethane film with the stretchable conductive wire formed thereon was elongated at a speed of 300 mm/min in the longitudinal direction of the stretchable conductive wire (rectangle) by using a precision universal testing machine AG-Xplus HS manufactured by SHIMADZU CORPORATION.

Change in electric resistance at 300% elongation=
[electric resistance (Ω) at 300% elongation)]÷
[initial electric resistance (Ω)]×100

Tables 2, 3 show the change in electric resistance at 300% elongation.

<Measurement of Maximum Resistance Value in Repetitive Elongations and Shrinkages Between 0 to 20%>

The polyurethane film with the stretchable conductive wire formed thereon was reciprocately elongated and shrunk 1000 times between the non-elongated state (0%) and 20%-elongated state to measure the over-time change in electric resistance of the conductive wire.

In this repetitive stretching test, the polyurethane film was elongated and shrunk at a tensile speed of 300 mm/min in the longitudinal direction of the stretchable conductive wire (rectangle) by using a precision universal testing machine AG-Xplus HS manufactured by SHIMADZU CORPORATION.

Moreover, electrodes were set inside a sample immobilization jig of the tensile tester (the precision universal testing machine AG-Xplus HS), and the electric resistance was measured by the 4-terminal resistance measurement method using PXIe-4136SMU resistance measurement unit manufactured by NATIONAL INSTRUMENTS CORP.

Change in maximum electric resistance value by
1000-time repetitive elongations and shrinkages
with elongation ratio between 0 and 20%=
[maximum electric resistance (Ω) in repetitive
stretching test]÷[initial electric resistance (Ω)]×
100

Tables 2, 3 show the change in maximum electric resistance by 1000-time repetitive elongations and shrinkages with an elongation ratio of 20%.

TABLE 2

|  | Polymer [parts by mass] | Conductive filler [parts by mass] | Solvent [parts by mass] | Baking temperature/ hours | Initial electric resistance (Ω) | Change (%) in electric resistance by 20% elongation | Change (%) in electric resistance by 300% elongation | Change (%) in maximum electric resistance by 1000-time repetitions of 0-20% elongations and shrinkages |
|---|---|---|---|---|---|---|---|---|
| Example 1 | PU1 [12] | Silver powder A [68] | BCA [20] | 140° C./ 4 hrs | 1.3 | 300 | 46150 | 2780 |
| Example 2 | PU2 [12] | Silver powder B [68] | BCA [20] | 140° C./ 4 hrs | 2.0 | 260 | 40820 | 2700 |
| Example 3 | PU3 [12] | Silver powder C [68] | BCA [20] | 140° C./ 4 hrs | 3.1 | 190 | 32360 | 970 |
| Example 4 | PU4 [12] | Silver powder D [68] | BCA [20] | 140° C./ 4 hrs | 2.5 | 380 | 48380 | 1200 |
| Example 5 | PU5 [12] | Silver powder E [68] | BCA [20] | 120° C./ 30 min | 7.9 | 290 | — | 1420 |
| Example 6 | PU6 [12] | Silver powder E [68] | BCA [20] | 120° C./ 30 min | 6.5 | 310 | — | 1450 |
| Example 7 | PU7 [12] | Silver powder E [68] | BCA [20] | 120° C./ 30 min | 7.0 | 320 | — | 2500 |
| Example 8 | PU8 [12] | Silver powder E [68] | BCA [20] | 120° C./ 30 min | 6.8 | 280 | — | 2100 |
| Example 9 | PU9 [12] | Silver powder E [68] | BCA [20] | 120° C./ 30 min | 6.6 | 300 | — | 1750 |
| Example 10 | PU10 [12] | Silver powder E [68] | BCA [20] | 120° C./ 30 min | 5.7 | 330 | — | 2200 |
| Example 11 | PU11 [12] | Silver powder E [68] | BCA [20] | 120° C./ 30 min | 6.4 | 300 | — | 1600 |

TABLE 2-continued

|  | Polymer [parts by mass] | Conductive filler [parts by mass] | Solvent [parts by mass] | Baking temperature/ hours | Initial electric resistance (Ω) | Change (%) in electric resistance by 20% elongation | Change (%) in electric resistance by 300% elongation | Change (%) in maximum electric resistance by 1000-time repetitions of 0-20% elongations and shrinkages |
|---|---|---|---|---|---|---|---|---|
| Example 12 | PU1 [12] | Copper powder A [68] | BCA [20] | 140° C./ 4 hrs | 6.9 | 350 | — | 2980 |

BCA: diethylene glycol monobutyl ether acetate
—: not measured

TABLE 3

|  | Polymer [parts by mass] | Conductive filler [parts by mass] | Solvent [parts by mass] | Baking temperature/ hours | Initial electric resistance (Ω) | Change (%) in electric resistance by 20% elongation | Change (%) in electric resistance by 300% elongation | Change (%) in maximum electric resistance by 1000-time repetitions of 0-20% elongations and shrinkages |
|---|---|---|---|---|---|---|---|---|
| Comparative Example 1 | Comparative PU1 [12] | Silver powder A [68] | BCA [20] | 140° C./ 4 hrs | 1.5 | 980 | broken | broken |
| Comparative Example 2 | Comparative PU2 [12] | Silver powder A [68] | BCA [20] | 140° C./ 4 hrs | 1.8 | 1010 | broken | 36600 |
| Comparative Example 3 | Comparative PU3 [12] | Silver powder A [68] | BCA [20] | 140° C./ 4 hrs | 22.2 | 670 | broken | 17850 |
| Comparative Example 4 | fluorine rubber [12] | Silver powder E [68] | BCA [20] | 120° C./ 30 min | 5.2 | 650 | broken | 6500 |
| Comparative Example 5 | polyester [12] | Silver powder E [68] | BCA [20] | 120° C./ 30 min | 9.9 | 1290 | broken | 9850 |

BCA: diethylene glycol monobutyl ether acetate

It can be seen as shown in Tables 2, 3 that when the conductive paste compositions each blended with the polyurethane containing a weakly acidic functional group with a pKa of 5 to 11 are used (Examples 1 to 11), increases in electric resistance due to the wire elongations are small, and the resulting conductive wires are excellent in conduction stability despite the repetitive elongations and shrinkages. In contrast, in Comparative Example 1 having a functional group with pKa of more than 11, Comparative Example 3 containing a functional group with pKa of less than 5, and Comparative Examples 2, 4, and 5 not containing acidic functional group, the electric resistances were considerably increased by the wire elongations and the repetitive elongations and shrinkages.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:
1. A polyurethane comprising a weakly acidic functional group having a pKa of 5 to 11,
wherein the polyurethane comprises a structure shown in a following general formula (2a), or the weakly acidic functional group comprises a structure shown by a following formula (1b) or (1c),

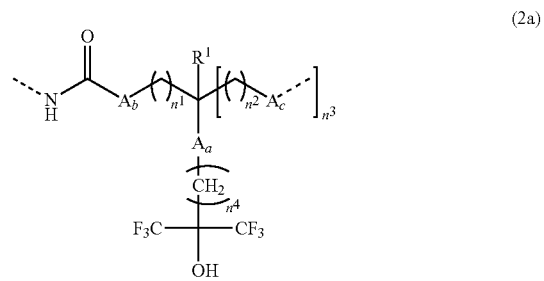

(2a)

wherein $R^1$ represents a hydrogen atom or a monovalent hydrocarbon group having 1 to 3 carbon atoms; $A_a$ represents a single bond, or a linear, branched, or cyclic divalent aliphatic hydrocarbon group having 1 to 20 carbon atoms, and —$CH_2$— constituting $A_a$ is optionally substituted with —O—, —C(=O)—, —C(=O)O—, or —$NR^5$—C(=O)—; $R^5$ represents a hydrogen atom, or a linear or branched alkyl group having 1 to 4 carbon atoms; $A_b$ and $A_c$ each represent —O—, —O—C(=O)—$NR^5$—, —$NR^5$—, or —C(=O)O—;

$n^1$, $n^2$, and $n^4$ each represent an integer of 0 to 10; $n^3$ represents an integer of 0 or 1; and a broken line represents a bonding arm,

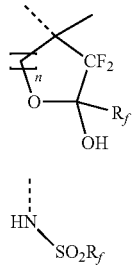
(1b)

(1c)

wherein R represents a hydrogen atom, a fluorine atom, or a linear, branched, or cyclic hydrocarbon group having 1 to 10 carbon atoms and optionally fluorinated; $R_f$ represents a fluorine atom, or a linear, branched, or cyclic fluorinated hydrocarbon group having 1 to 10 carbon atoms; "n" represents an integer of 1 or 2; and a broken line represents a bonding arm.

2. A conductive paste composition comprising:
(A) a conductive filler;
(B) the polyurethane according to claim 1; and
(C) a solvent.

3. The conductive paste composition according to claim 2, wherein the conductive filler of the component (A) is contained in a proportion exceeding 70 parts by mass relative to 100 parts by mass of a total of the components (A) and (B).

4. The conductive paste composition according to claim 2, wherein the conductive filler is selected from the group consisting of gold, silver, silver chloride, platinum, copper, tin, iron, magnesium, titanium, nickel, palladium, aluminum, tungsten, molybdenum, ruthenium, chromium, indium, solder, carbon, and composites thereof.

5. The conductive paste composition according to claim 2, wherein the conductive filler has an average particle diameter of 5 nm to 10 μm.

6. The conductive paste composition according to claim 2, wherein the conductive filler is a silver powder.

7. A conductive wire comprising a baked product of the conductive paste composition according to claim 2 formed on a substrate.

8. The conductive wire according to claim 7, wherein the substrate is stretchable.

9. The conductive wire according to claim 7, wherein the substrate is a thermoplastic polyurethane.

10. The conductive wire according to claim 7, wherein the conductive wire elongated by 20% has an electric resistance which is 500% or less of an electric resistance before the elongation.

11. The conductive wire according to claim 7, wherein a maximum electric resistance of the conductive wire which is elongated and shrunk repeatedly 1000 times with an elongation ratio of 20% is 5000% or less of an electric resistance before the elongations and the shrinkages.

12. A method for producing a conductive wire by using the conductive paste composition according to claim 8 to form a conductive wire on a substrate, wherein the conductive wire is formed with a baking temperature of 60 to 160° C.

13. A method for producing a conductive wire, comprising printing the conductive paste composition according to claim 8 to form a conductive wire on a substrate.

14. The polyurethane according to claim 1, comprising a structure shown by any of the following general formulae (2b) to (2c),

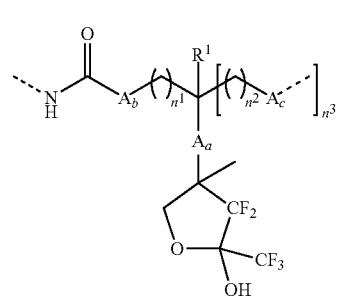
(2b)

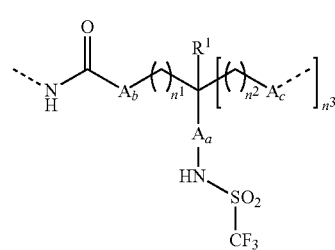
(2c)

wherein $R^1$ represents a hydrogen atom or a monovalent hydrocarbon group having 1 to 3 carbon atoms; $A_a$ represents a single bond, or a linear, branched, or cyclic divalent hydrocarbon group having 1 to 20 carbon atoms, and —$CH_2$— constituting $A_a$ is optionally substituted with —O—, —C(=O)—, —C(=O)O—, —$C_6H_4$—, or —$NR^5$—C(=O)—; $R^5$ represents a hydrogen atom, or a linear or branched alkyl group having 1 to 4 carbon atoms; $A_b$ and $A_c$ each represent —O—, —O—C(=O)—$NR^5$—, —$NR^5$—, or —C(=O)O—; $n^1$, $n^2$, and $n^4$ each represent an integer of 0 to 10; $n^3$ represents an integer of 0 or 1; and a broken line represents a bonding arm.

15. A method for producing the polyurethane according to claim 14, comprising introducing the weakly acidic functional group to a polyurethane by using a chain extender which is an alcohol shown by the following general formula (3a) or (3b),

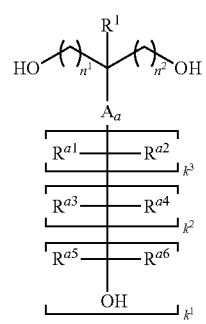
(3a)

-continued (3b)

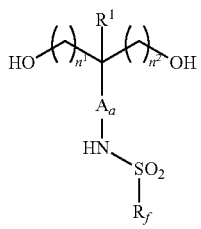

wherein $R^{a1}$, $R^{a2}$, $R^{a3}$, $R^{a4}$, $R^{a5}$, and $R^{a6}$ each independently represent a hydrogen atom, a fluorine atom, an oxygen atom, a linear, branched, or cyclic hydrocarbon group, a perfluoroalkyl group, a perfluoroalkylene group, or a perfluoroalkoxy group, which groups have 1 to 6 carbon atoms, provided that at least one of $R^{a1}$, $R^{a2}$, $R^{a3}$, $R^{a4}$, $R^{a5}$, and $R^{a6}$ is a fluorine atom, a perfluoroalkyl group, a perfluoroalkylene group, or a perfluoroalkoxy group; $R^{a1}$ and $R^{a2}$, $R^{a3}$ and $R^{a4}$, $R^{a5}$ and $R^{a6}$, $R^{a1}$ and $R^{a3}$, $R^{a1}$ and $R^{a5}$, or $R^{a3}$ and $R^{a5}$, are optionally bonded to each other together with a carbon atom bonded therewith to form a non-aromatic ring having 3 to 8 carbon atoms; some —CH$_2$— constituting $R^{a1}$, $R^{a2}$, $R^{a3}$, $R^{a4}$, $R^{a5}$, or $R^{a6}$ is optionally substituted with an oxygen atom to form a hetero ring; $k^1$ represents an integer of 1 or 2; $k^2$ and $k^5$ each represent an integer of 0 to 10; $R_f$ represents a fluorine atom, or a linear, branched, or cyclic fluorinated hydrocarbon group having 1 to 10 carbon atoms; and $R^1$, $A_a$, $n^1$, and $n^2$ are as defined above.

16. The method for producing the polyurethane according to claim 5, comprising introducing the weakly acidic functional group to a polyurethane by using a chain extender which is an alcohol shown by any of the following general formulae (4a) to (4c), (4a)

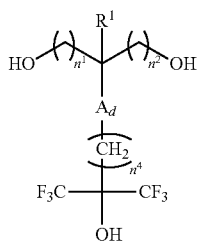

(4b)

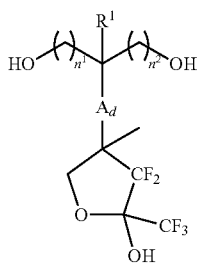

(4c)

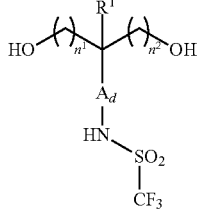

wherein
in general formula (4a), $A_d$ represents a single bond, or a linear, branched, or cyclic divalent aliphatic hydrocarbon group having 1 to 20 carbon atoms, and —CH$_2$— constituting $A_d$ is optionally substituted with —O—, —C(═O)—, —C(═O)O—, or —NR$^5$—C(═O)—;
in general formula (4b) and (4c), $A_d$ represents a single bond, or a linear, branched, or cyclic divalent hydrocarbon group having 1 to 20 carbon atoms, and —CH$_2$— constituting $A_d$ is optionally substituted with —O—, —C(═O)—, —C(═O)O—, —C$_6$H$_4$—, or —NR$^5$—C(═O)—; and $R^1$, $n^1$, $n^2$, and $n^4$ are as defined above.

17. The method for producing the polyurethane according to claim 16, comprising introducing the weakly acidic functional group to a polyurethane by using a chain extender which is an alcohol shown by the following general formula (5), (5)

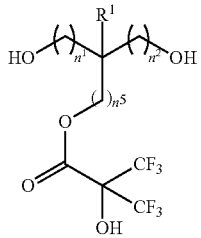

wherein n' represents an integer of 0 to 10; and $R^1$, $n^1$, and $n^2$ are as defined above.

* * * * *